US012044216B2

(12) United States Patent
Raimund

(10) Patent No.: US 12,044,216 B2
(45) Date of Patent: Jul. 23, 2024

(54) NACELLE COVER FOR A WIND TURBINE

(71) Applicant: Jupiter Bach A/S, Køge (DK)

(72) Inventor: Ulrik Raimund, Bogø By (DK)

(73) Assignee: Jupiter Bach A/S, Køge (DK)

( * ) Notice: Subject to any disclaimer, the term of this patent is extended or adjusted under 35 U.S.C. 154(b) by 0 days.

(21) Appl. No.: 17/776,009

(22) PCT Filed: Nov. 13, 2020

(86) PCT No.: PCT/EP2020/082110
§ 371 (c)(1),
(2) Date: May 11, 2022

(87) PCT Pub. No.: WO2021/094568
PCT Pub. Date: May 20, 2021

(65) Prior Publication Data
US 2022/0397100 A1    Dec. 15, 2022

(30) Foreign Application Priority Data

Nov. 15, 2019 (DK) .............................. PA201970699
Apr. 24, 2020 (DK) .............................. PA202070252
(Continued)

(51) Int. Cl.
*F03D 80/80*    (2016.01)
*F03D 15/00*    (2016.01)

(52) U.S. Cl.
CPC .............. *F03D 80/80* (2016.05); *F03D 15/00* (2016.05); *F03D 80/88* (2016.05); *F05B 2280/6003* (2013.01)

(58) Field of Classification Search
CPC .......... F03D 15/00; F03D 80/80; F03D 80/88; F05B 2280/6003
See application file for complete search history.

(56) References Cited

U.S. PATENT DOCUMENTS 7,857,599 B2 * 12/2010 Bagepalli ................ F03D 80/00
                                                             415/908
9,556,851 B2 *  1/2017 Zhu ......................... F16F 7/116
(Continued)

FOREIGN PATENT DOCUMENTS

WO    1997/03288 A1    1/1997
WO    2019/034214 A1   2/2019

OTHER PUBLICATIONS

International Search Report and Written Opinion in related international application No. PCT/EP2020/082110 dated Mar. 5, 2021.
(Continued)

*Primary Examiner* — David E Sosnowski
*Assistant Examiner* — Jason G Davis
(74) *Attorney, Agent, or Firm* — Polsinelli, P.C.

(57) ABSTRACT

A nacelle cover (100) for a wind turbine includes an elongate housing (105) and the front end (107) of the housing (105) is mounted on a bed plate frame (420) which is affixed to the tower (122), the bed plate frame (420) supporting at least one part of a drive train (124) of the wind turbine. At least one machinery component (125) is mounted on the housing (105) at a position laterally spaced from the bed plate frame (420) in a longitudinal direction along the housing (105). The housing (105) includes a structural tube (128) which functions as a vertically displaceable cantilever beam carrying the load of the at least one machinery component (125) mounted thereon.

28 Claims, 14 Drawing Sheets

(30) Foreign Application Priority Data

Apr. 24, 2020 (DK) .............................. PA202070253
Apr. 24, 2020 (DK) .............................. PA202070254

(56) References Cited

U.S. PATENT DOCUMENTS

| | | | |
|---|---|---|---|
| 9,677,543 B2* | 6/2017 | Kamibayashi | F03D 80/00 |
| 9,738,055 B2* | 8/2017 | Grove-Nielsen | B29C 70/226 |
| 9,970,138 B2* | 5/2018 | Linnet | D04H 1/70 |
| 2013/0011272 A1* | 1/2013 | Mortensen | F03D 13/10 |
| | | | 416/244 R |
| 2015/0152881 A1* | 6/2015 | Tirumalai | F03D 80/80 |
| | | | 415/182.1 |
| 2017/0363071 A1* | 12/2017 | Baun | F03D 15/00 |

OTHER PUBLICATIONS

International Preliminary Report on Patentability in related international application No. PCT/EP2020/082110 dated May 17, 2022.

* cited by examiner

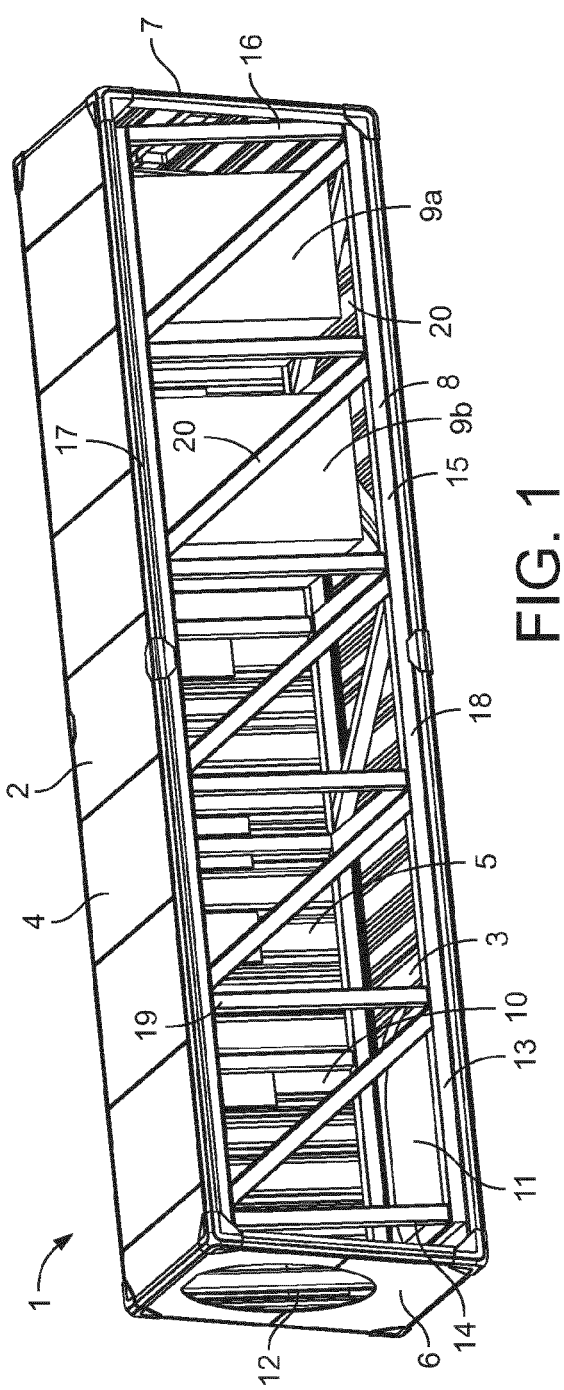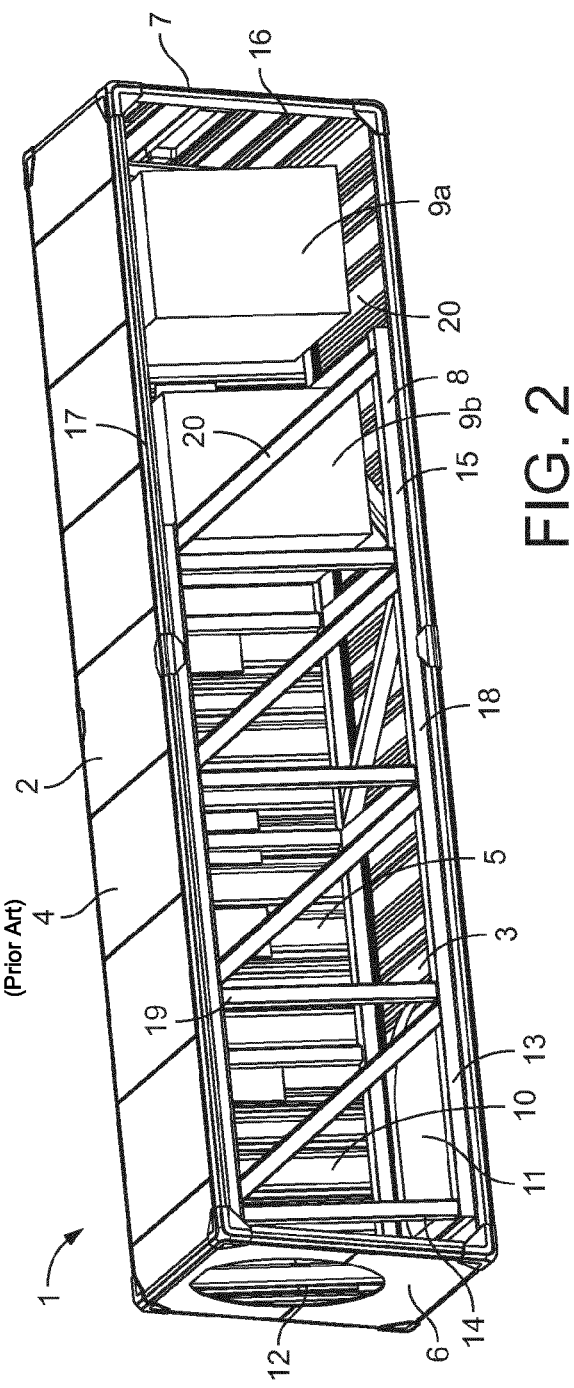

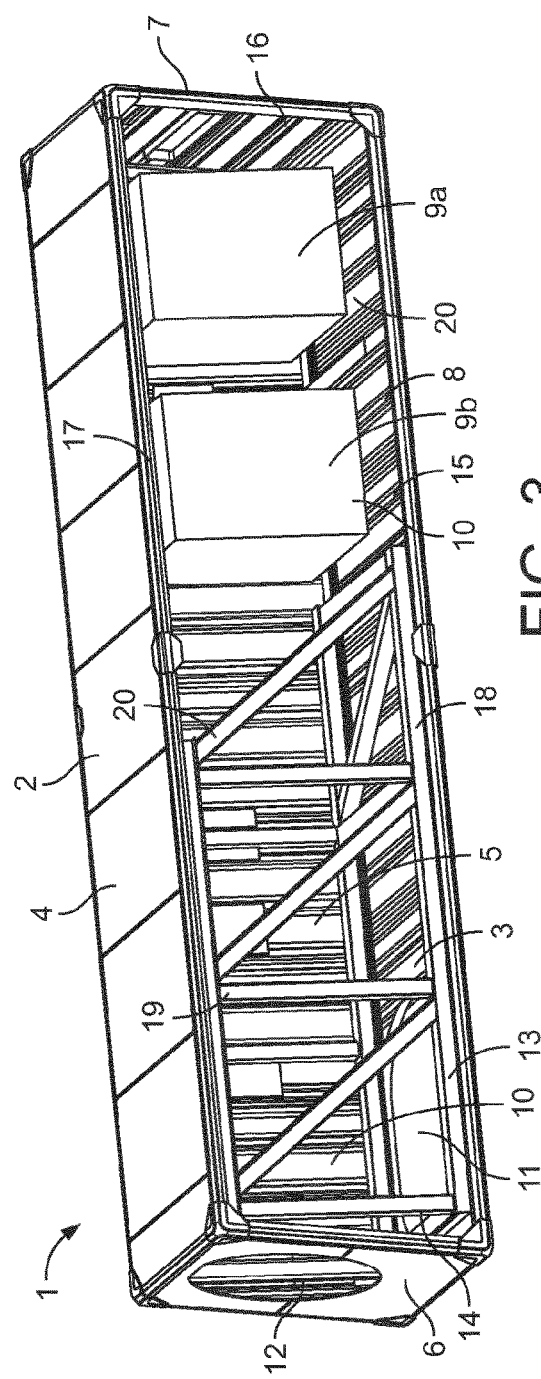
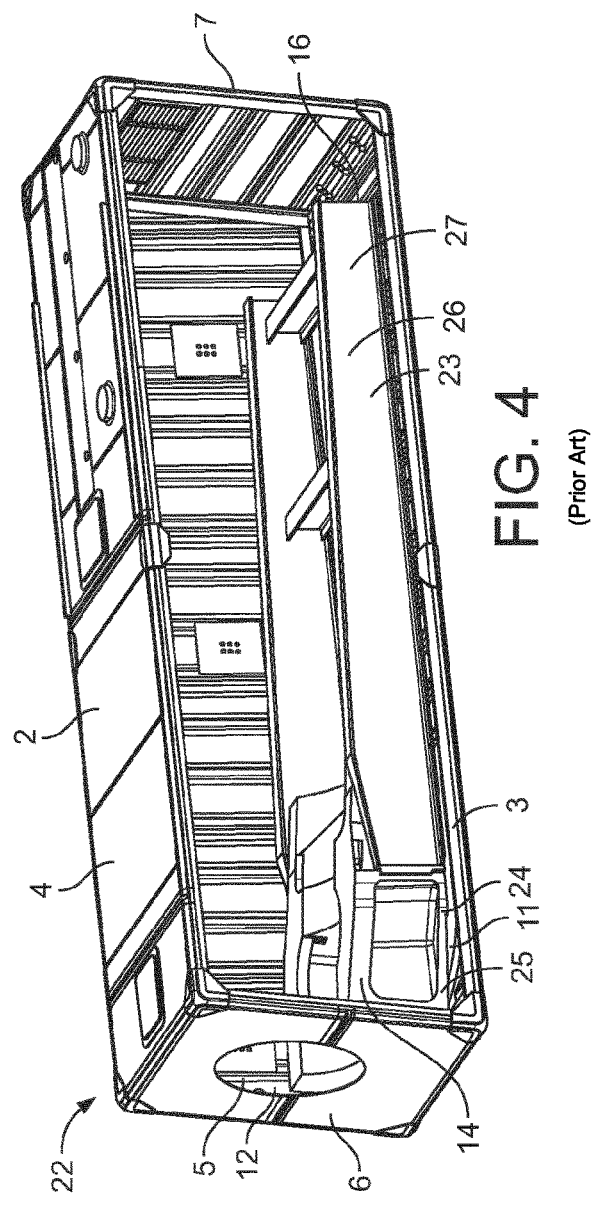

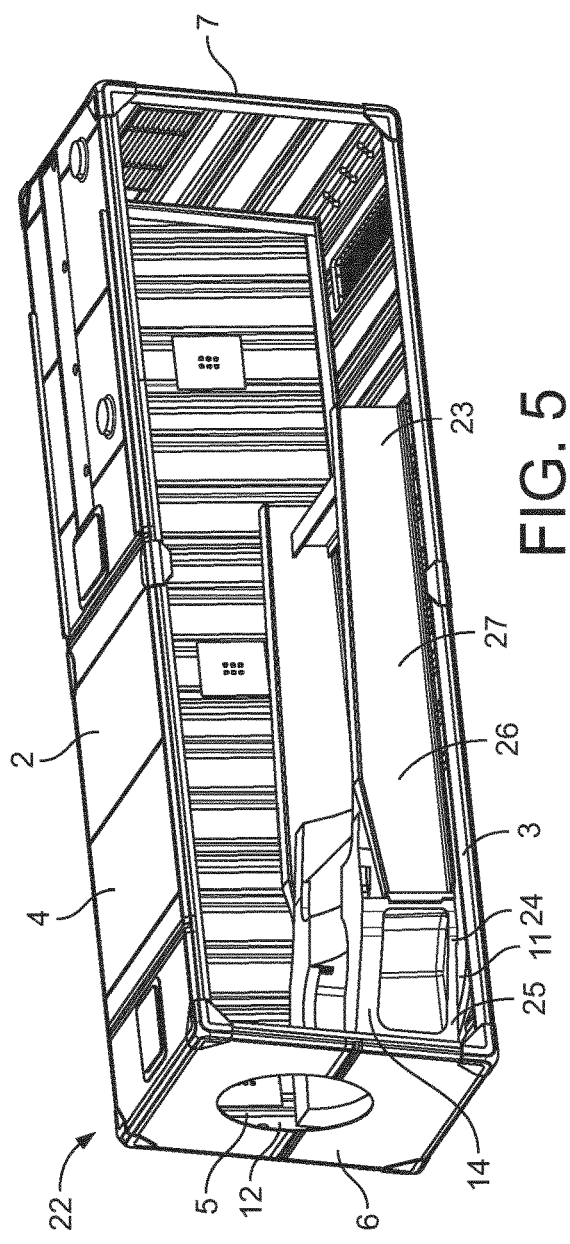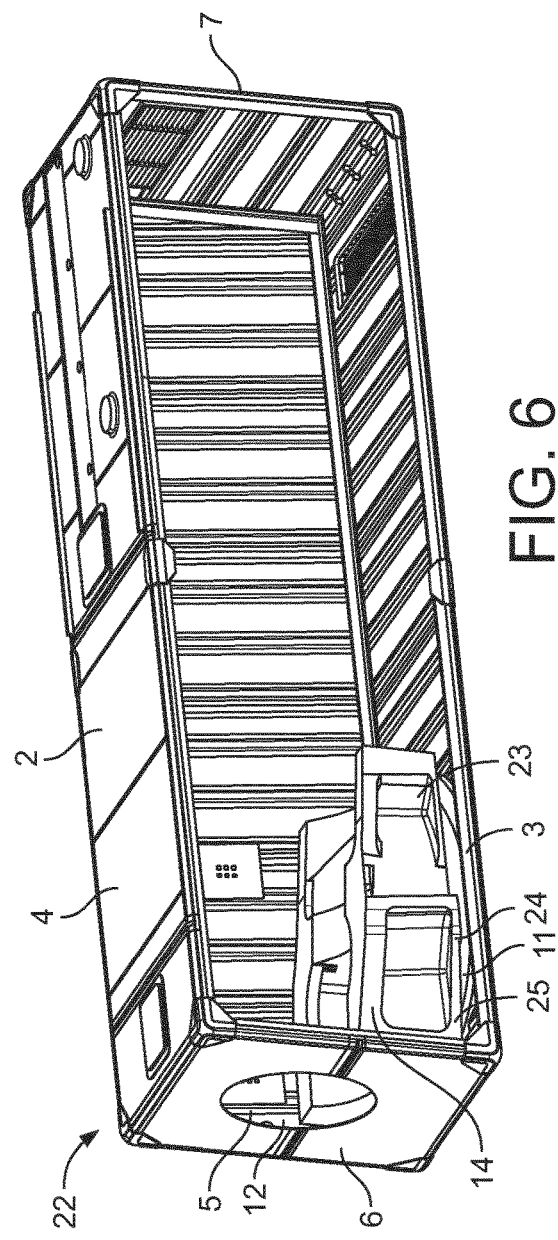

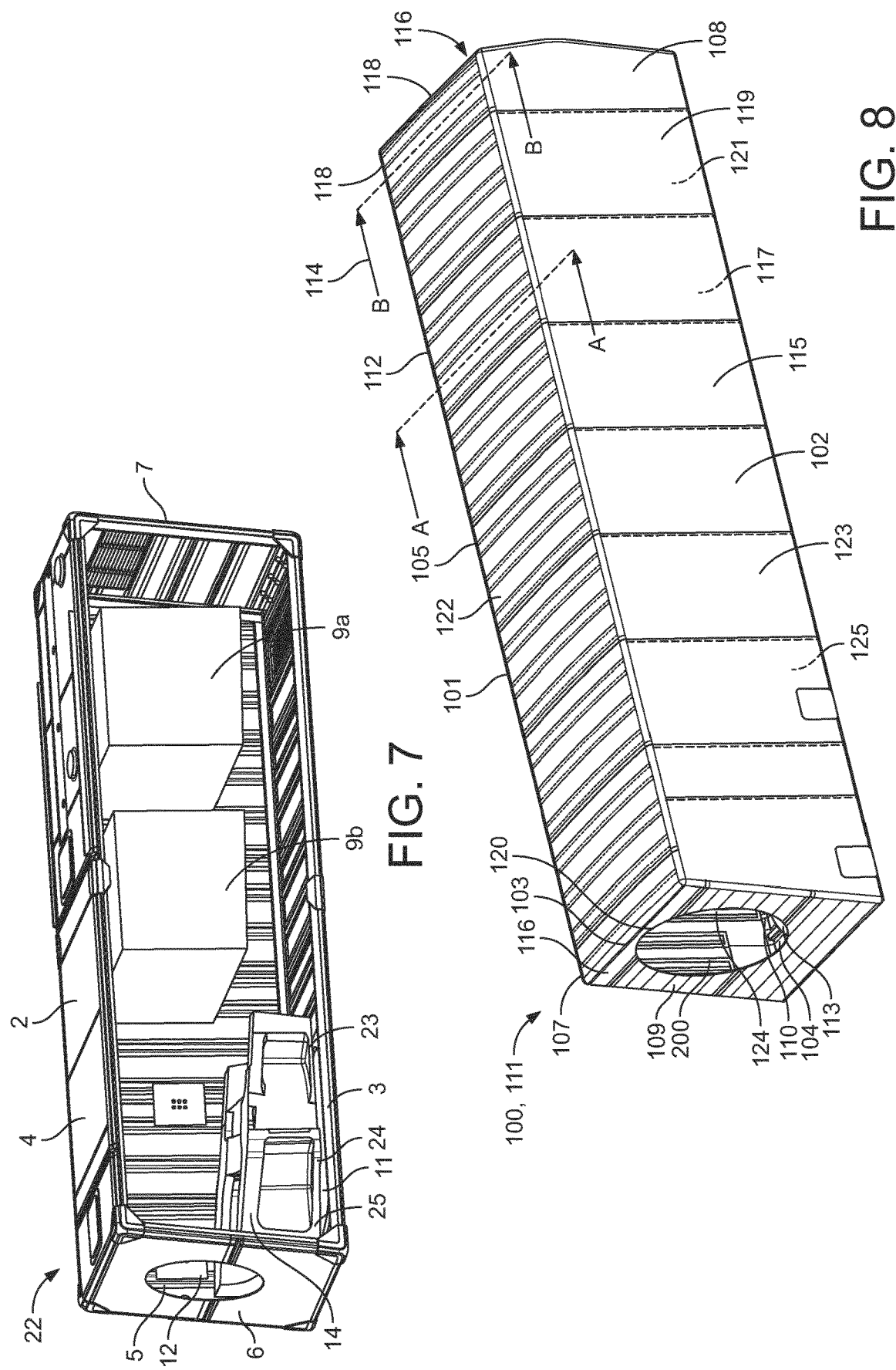

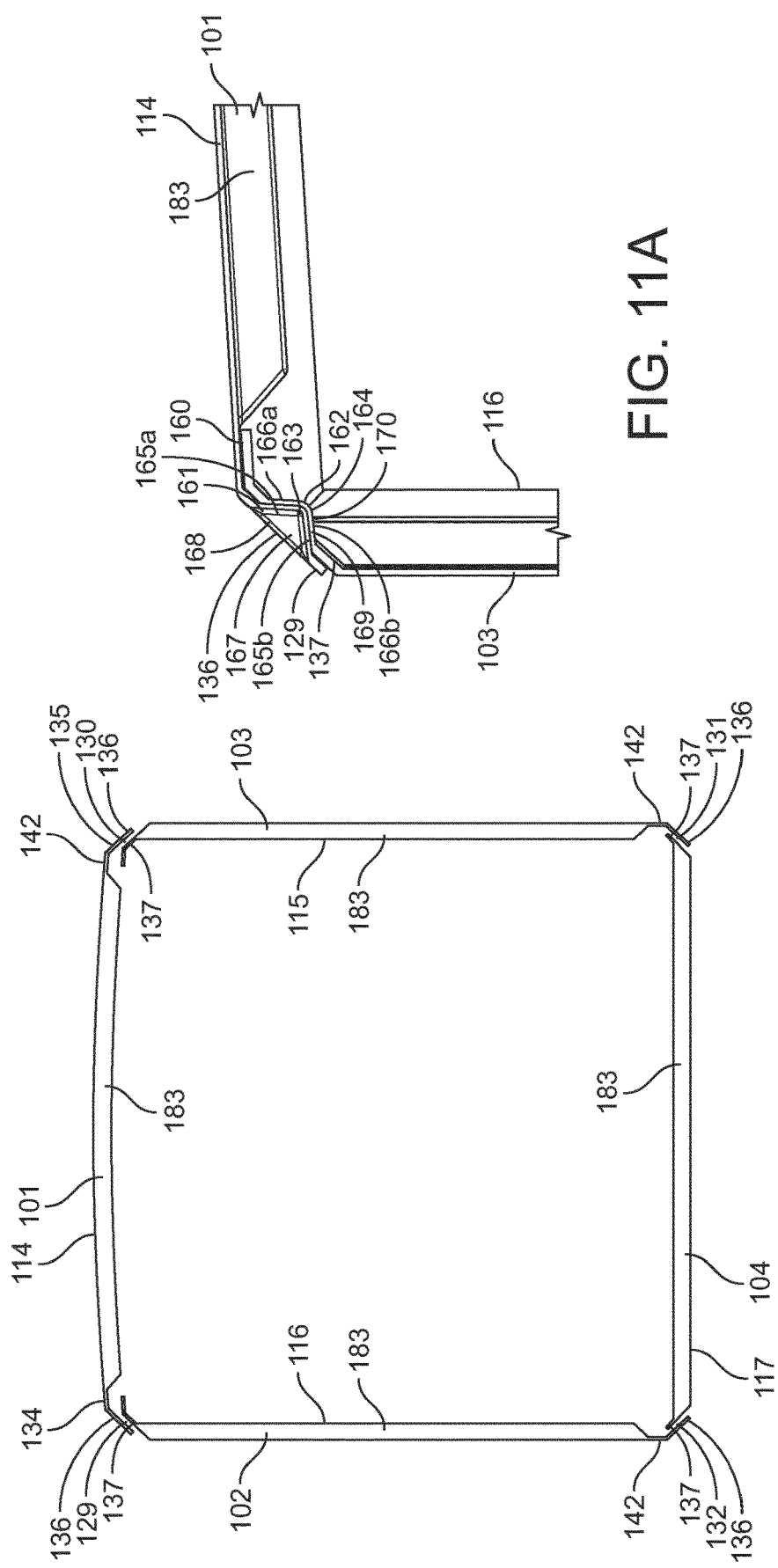

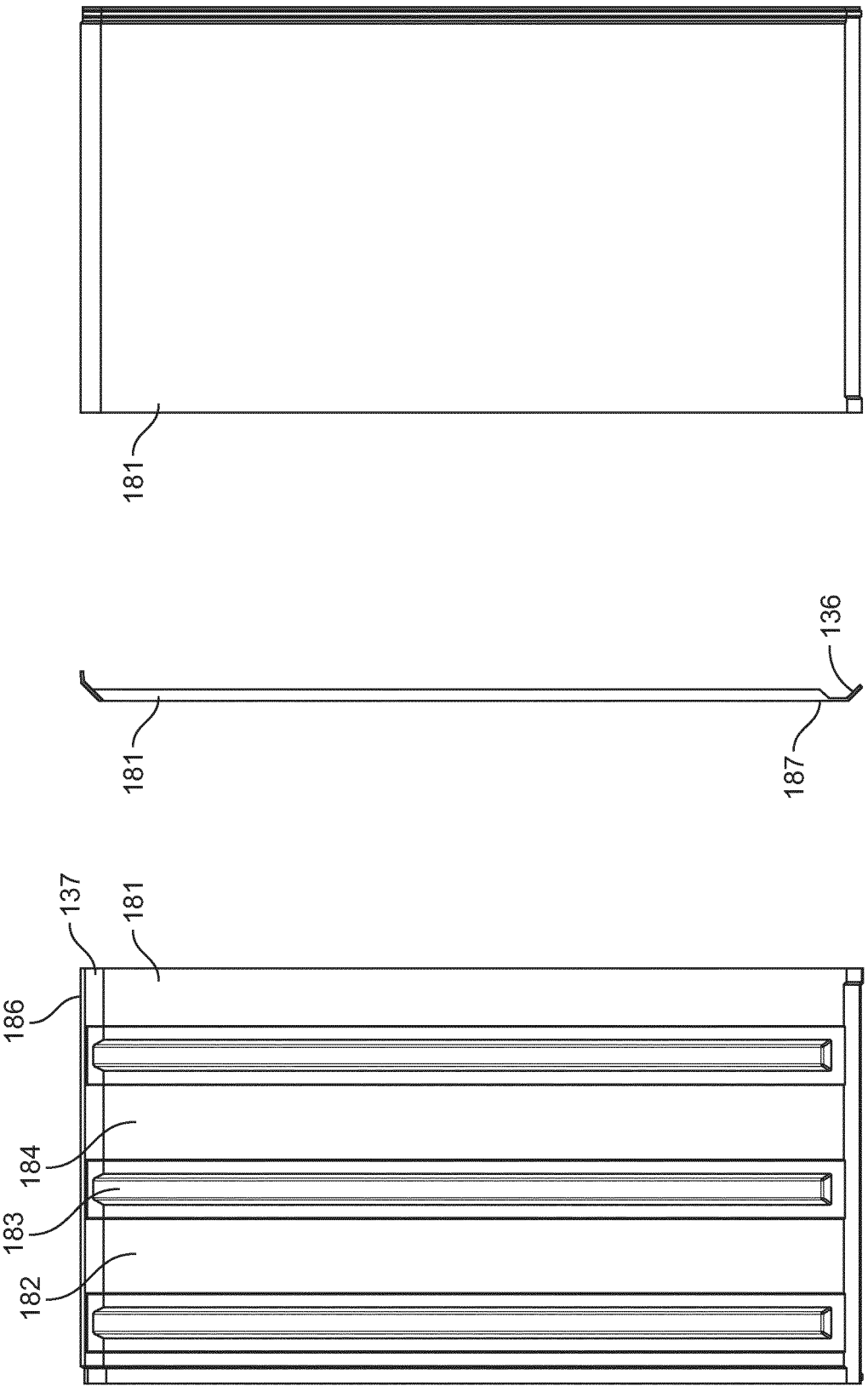

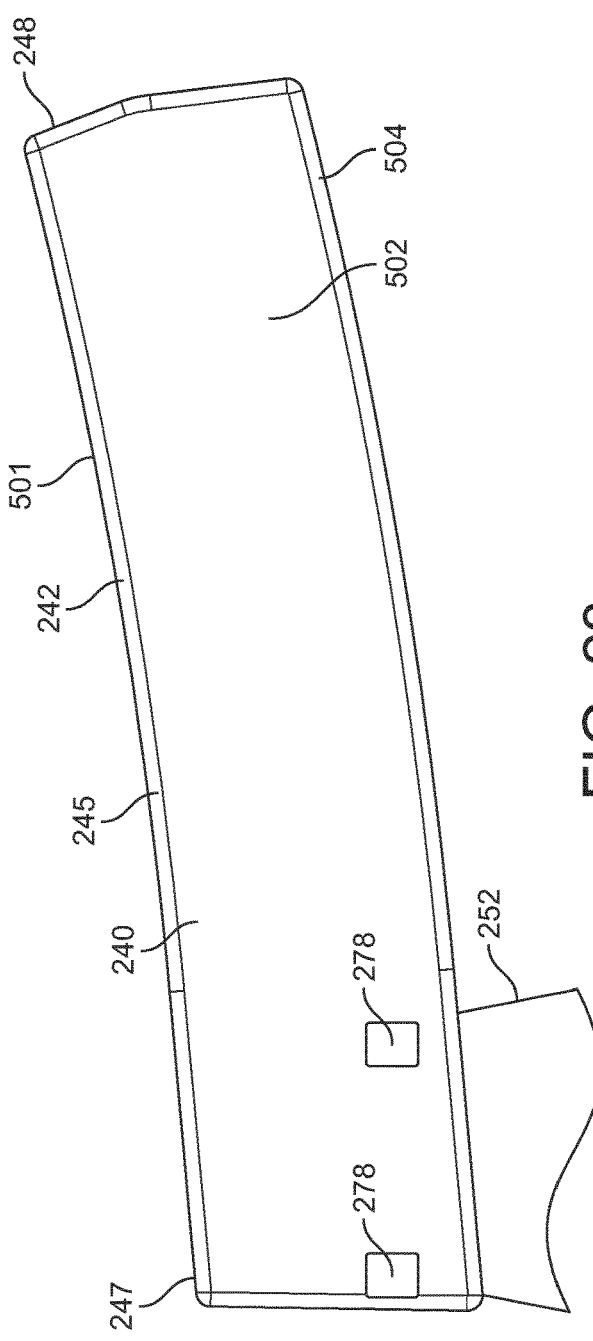
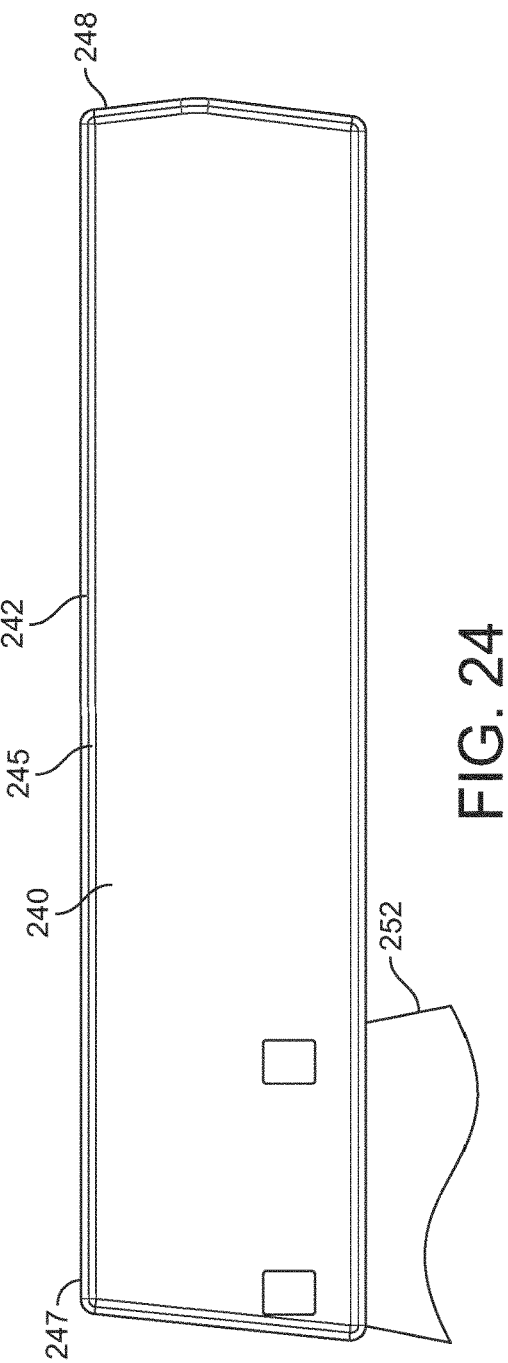
FIG. 23
FIG. 24

NACELLE COVER FOR A WIND TURBINE

FIELD OF THE INVENTION

The present invention relates to a nacelle cover for a wind turbine.

BACKGROUND

A wind turbine converts the kinetic energy in the wind into mechanical power by means of a rotor coupled to main machinery components. Wind turbines comes in various sizes ranging from small wind turbines to very large turbines, the majority of which are large three-bladed horizontal-axis wind turbines (HAWT). The large wind turbines are high and have a very large numbers of main machinery component groups and subcomponents installed on a frame inside the nacelle cover. Wind turbines from different manufacturers have different frames and arrangements of machinery to fit inside the various designs of composite nacelle cover, which designs have an impact on the arrangement of the machinery as well.

One of the largest components located inside the nacelle cover of a wind turbine is the load-carrying frame, which is also known to be one of the most critical components of the wind turbine. The load-carrying frame typically consists of a rear frame part, a front frame part, and optionally a generator frame part, which frame parts are installed in the nacelle cover to carry and support many of the components and machinery that transform the wind's kinetic energy conferred to the rotor into mechanical energy to turn a generator that produces electric power. The components and machinery are hitherto installed on the load-carrying frame, which is then lifted into the nacelle cover, secured to the nacelle cover and aligned with the rotor to be put in operative condition to gain electric power. The front frame part and the optional general frame part may be referred to as the bed plate frame and the rear frame part may be referred to as the main frame.

The load-carrying frame is typically a cast steel frame or a steel frame bolted together, and thus very heavy, and expensive to manufacture. Moreover, said load-carrying frame must be subjected to expensive quality controls and non-destructive testings. The load-carrying frame are also expensive, strenuous, and time-consuming to transport to the erection site, as well as to lift into the nacelle cover with the components and machinery supported on the load-carrying frame, as dealt with in U.S. Pat. No. 7,793,964 B2 and European patent application no. EP 3 246 561 A1, respectively.

In a typical wind turbine, the hub is secured to the front of the nacelle cover with the blades directly bolted to the hub, or bolted to the hub via a pitch bearing. The yaw system, mainshaft bearing, gearbox, generator, transformer and electrical control cabinets are behind the hub and conventionally mounted on the front frame of the nacelle.

The load-carrying frame can e.g. be made as two heavy main cast and/or welded steel parts, wherein e.g. the yaw system, main shaft, and optionally the gearbox, are secured to the front frame part, and the transformer, and electrical cabinets are secured to the rear frame part. The generator can conventionally be secured to any of the front frame part and the rear frame part. Once the yaw system passes its rotational test and its motors are installed and pass their functional tests, the front frame part and rear frame part are joined by heavy bolts. The entire load-carrying frame assembly with its machinery and other components is then attached by brackets to the walls of the fiber-reinforced composite nacelle cover.

European patent application no. EP 2 322 795 A2 describes an example of a load-carrying frame installed in a nacelle cover.

A load-carrying frame is thus disposed within the nacelle cover to carry and support the main machinery components of the wind turbine using a plurality of brackets mounted at an upper and a lower portion of the load-carrying frame to secure the load-carrying frame to the nacelle inner.

The wind industry is always in demand of ways to reduce productions costs and to improve the ways a wind turbine is produced, so it is a main aspect of the present invention to reduce productions costs of a wind turbine.

SUMMARY OF THE INVENTION

In yet an aspect is provided a wind turbine, for which the amount of steel for manufacturing the load-carrying frame can be reduced.

In yet an aspect is provided a nacelle having a substantially smaller, typically substantially shorter load-carrying frame than the interior length of the composite nacelle cover.

In yet an aspect is provided a nacelle, which is less heavy than hitherto known.

In one aspect, the present invention provides a nacelle cover for a wind turbine, wherein the nacelle cover comprises a roof, opposite sidewalls and a floor assembled together to form a composite material elongate housing defining an interior space for containing machinery components of the wind turbine, the housing having a front end for mounting to a tower of the wind turbine, and an opposite rear end, wherein each of the roof, the opposite sidewalls and the floor comprises a fibre-reinforced polymer composite material, characterised in that the front end of the housing is mounted on a bed plate frame which is affixed to the tower, the bed plate frame supporting at least one part of a drive train of the wind turbine, and at least one machinery component is mounted on the housing at a position laterally spaced from the bed plate frame in a longitudinal direction along the housing, and the housing comprises a structural tube which functions as a vertically displaceable cantilever beam carrying the load of the at least one machinery component mounted thereon.

Preferred or optional features are defined in dependent claims.

Also disclosed herein as another aspect of the present invention is a composite nacelle cover which has a composite wall constituting a first load-carrying structure for at least one component of a first part of main machinery components of the wind turbine, preferably for several components of the first part of main machinery components, and preferably all components of the first part of main machinery components.

Thus at least some of the machinery and operative components of the wind turbine that converts the kinetic energy of the wind into electrical power are installed inside the composite nacelle cover by being secured directly to the composite wall of the composite nacelle cover, e.g. by means of brackets and bolts, without said first part of main machinery components are supported on a load-carrying frame. Instead such first part of main machinery components can be secured directly to the composite wall of the composite nacelle cover at selected securing points and locations. In other words the composite nacelle cover has at least one main machinery component secured to the composite wall of said composite nacelle cover instead of to a load-carrying frame.

Within the scope of the present invention the term "nacelle cover" is understood to mean the part of the wind turbine that houses the main machinery, and to which the rotor are mounted at a front end. Typically the composite nacelle cover has a bottom hole that is aligned with a hole in a bed plate at the top of the tower.

Within the scope of the present invention the term "composite" means a made from two or more constituent materials with significantly different physical or chemical properties that, when combined, produce a material with characteristics different from the individual components. The "composite" preferably include a polymer matrix reinforced with fibers. Fibre-reinforced polymers may be thermosettings, e.g. carbon-fibre-reinforced polymer (CFRP) and glass-reinforced plastic (GRP). The plastic composite may be used in a laminate having a core, such a foam core, e.g. a polyurethane foam core of a honeycomb structure, sandwiched between opposite composite face skins, thereby providing thickness and structural strength to the laminate, and thus to a wall of a composite nacelle cover made of such laminate.

Within the scope of the present invention the term "bed plate" or "bed plate frame" means the transition piece of the load-carrying frame located inside the composite nacelle cover and connecting the main bearing(s), the shafts, the generator, and optionally the gearbox if present, towards the rotor at one side, and the yaw bearing towards the tower on the other side. The terms "bedplate" and "bed plate frame" are used interchangeably in the following description.

Within the scope of the present invention the term "main machinery components", "main components", and "machinery" are used interchangeably for the components including but not limited to the main support, yaw system, brakes, cooling system, transformer, computer, electrical control cabinets, and the drive train including the low-speed shaft (main shaft), the gearbox, the high-speed shaft, shaft bearings, and the generator.

By securing some of the main machinery components to the composite wall of the composite nacelle cover, e.g. to the floor and/or sides of the composite nacelle cover, instead of to a load-carrying frame, a lot of heavy steel for manufacturing said load-carrying frame can be dispensed with, as well as costs and many man-hours for testing the conventionally long load-carrying frame can be saved.

Some manufactures may however choose to still use a part of a load-carrying frame for supporting at least one component of a second part of the main machinery components of the wind turbine, which part of the load-carrying frame may constitutes a second load-carrying structure for the main machinery components not being secured to the composite wall of the composite nacelle cover. It is however preferred to support as few components of the second part of the main machinery components as possible on the load-carrying frame, and instead utilize the composite nacelle cover wall as the load-carrying structure.

The composite nacelle cover can be a fiber-reinforced composite nacelle cover, preferably a fiber-reinforced composite nacelle cover having opposite plastic face skins laminating a foam core. The fiber-reinforced composite may e.g. be glass fibers/epoxy matrix composites, natural composites, hybrid and nanoengineered composites, and e.g. any of the composites described in the article *"Materials for Wind Turbine Blades: An Overview"*, by Leon Mishnaevsky, Jr., Kim Branner, Helga Norgaard Petersen, Justine Beauson, Malcolm McGugan, and Bent F. Sorensen published in Materials Oct. 13, 2017. Fiber reinforcement increases the strength of the plastic by acting as a stress dissipater. When the plastic, the polymer, is subjected to stress forces the energy is transferred to the stronger reinforcing fibers embedded within the plastic matrix. The fibers transmit the stress over a wider physical area or throughout the entire plastic skin.

Metal nacelle covers are explicitly excluded, and do not form part of the present invention. Drilling holes for brackets for securing of main machinery components in a metal nacelle wall provides a basis and a path for rust formations and corrosive attack due to humid always present in the surroundings. Expensive precautionary provisions, actions and processes are required to avoid these consequences, such as additional post processes, such as painting and frequent shifting of many bolts and brackets, as well as extra surveillance to observe consequences early. Thus metal nacelle covers are not appropriate for the present invention.

The part of the load-carrying frame that constitutes the second load-carrying structure can be at least a part of a front frame of the main frame, or be the entire front frame, thus the entire bed plate, in which cases the second part of the main machinery components may include machinery components selected from the group comprising one or more machinery components of the drive train, optionally also the yaw system or a part of the yaw system. Thus even the length of the front frame can be reduced compared to conventional front frames, and still provide sufficiently safe and strong support, as just a part of the entire load-carrying structure, still keeping e.g. the drive train properly aligned.

Emphasize is added that for some composite nacelle covers no rear frame is needed at all, optionally no front frame will be needed either, in that the wall of the composite nacelle cover may be the sole load-carrying structure.

The composite nacelle cover described in the applicant's own International patent application no. WO2019/034214 is particularly suited for use as load-carrying structure for the main machinery components. This only composite nacelle cover can accommodate a reduced size load-carrying frame or no load-carrying frame at all.

International patent application no. WO2019/034214 describes a scalable modular nacelle assembly structure comprised of standard size panel sub-elements of fiber-reinforced composite laminate. These standard size panel sub-elements are preferably sections cut from elongate composite laminate sheet panels having coupling profiles to join to similarly obtained adjacent panel sub-elements, e.g. joined side by side. The panel sub-elements can in the alternative be molded as individual subcomponents. The surrounding wall of the fiber-reinforced composite nacelle is assembled without using a supporting framework or skeleton for securing and supporting the panel sub-elements. The applicant can establish by way of calculations, and tests will confirm, that a modular nacelle assembly structure assembled of standard panel sub-elements of fiber-reinforced composite laminate as defined in International patent application no. WO2019/034214 is strong, and optimal useful, as the load-carrying structure for at least a part, and preferably at least the majority, of all of the main machinery components, at no risk that the machinery components displace or disengage the composite wall even under heavy external forces, or without the need for the increased maintenance mentioned for the metal nacelle cover. The overlapping coupling profiles of the modular nacelle assembly structure described in International patent application no.

WO2019/034214 defines zones of very high structural strength and integrity that allows the wall of said nacelle assembly structure itself to constitute the support surface and load-carrying structure for securing main machinery components of the wind turbine without using a load-carrying frame, or just using a part of the conventional load-carrying frame. The composite nacelle cover and the manufacturing method of panel sub-elements of International patent application no. WO2019/034214 is incorporated in full in the present application.

Emphasis is made that the present invention is not limited to be used with just the composite nacelle cover described in the applicant's own International patent application no. WO2019/034214. Within the scope of the present invention main machinery components can be implemented in a multiplicity of other kinds of composite nacelle covers without using a load-carrying frame, or just using a part of the total length of the normally used load-carrying frame for said composite nacelle cover. The present invention is suited for both complex and simple composite nacelle cover designs. The present invention may reduce the overall length of the nacelle, and the nacelle may in the long view be made shorter due to the invention offers a better utilization of the interior space of the composite nacelle cover. This way the invention may save even further productions costs for the wind energy industry.

In an initial embodiment the first part of main machinery components being secured to the first load-carrying structure may be one or more of the transformer, the computer and/or the electrical control cabinet(s).

A first part of main machinery components can be lifted separately and fast into the nacelle hollow as individual main machinery component(s), which process of course is less heavy and complicated than when lifting the combined installation of all main machinery components on a load-carrying frame. Once inside the composite nacelle cover each component of the first part of main machinery components can subsequently be secured to the wall of the composite nacelle cover. The second part of the main machinery components of the wind turbine that might remain secured to at least a part of the load-carrying frame can be lifted in conventional manner inside the composite nacelle cover, but this assembled structure is still much less heavy and easier to lift than if a fully equipped load-carrying frame is lifted. In conventional wind turbines all parts of main machinery components are lifted in common on a load-carrying frame, which put a high demand on the ways the parts must be secured to the load-carrying frame in order not to displace to any extent at all in relation to each other, or drop off the load-carrying frame during lifting. When fewer parts of main machinery need to be lifted in common the lifting process is less vulnerable to failure and wind influences. A separate component of the first part of main machinery components only needs to be secured to the load-carrying composite nacelle cover wall at few points.

The invention also provides freedom to install individual components on other positions inside the composite nacelle cover than previously defined and dictated by the conventional load-carrying frame composed of both a bed plate frame and a main frame. Thus the interior positioning arrangement of main machinery components, and the design of said arrangement, can, provided the mechanical interaction of main machinery components allow it and is not affected or destroyed, be customized and targeted for each customer and each nacelle design, and easily changed if the demand and possibility arises.

The size of the load-carrying frame can, when used in a composite nacelle cover, be reduced substantially compared to conventional configurations of load-carrying steel frames for conventionally known wind turbine machinery, this way saving a lot of weight. Thus reducing the size, in particular the length, of the load-carrying frame, e.g. by elimination of the main frame, does not only save amounts of steel, the transport costs are also reduced, as well as lifting costs, testing costs, and work time costs. Furthermore, utilization of the interior space of the composite nacelle cover can be optimized and utilized the best possible way.

In case a load-carrying frame is provided in the composite nacelle cover it is preferred that the length of the load-carrying frame from a nacelle front end towards a nacelle rear end is shorter than the length of plural serially arranged main machinery components, wherein the nacelle front end is closest to the rotor and the nacelle rear end is farthest from the rotor.

The load-carrying frame of the composite nacelle cover of the present invention may in accordance with the present invention have a front frame part (a bed plate frame), and only a part of a rear frame part (main frame).

In the alternative the load-carrying frame has no rear frame part at all and the machinery components normally secured to the rear frame part are secured directly to the wall of the composite nacelle cover.

The front frame part can be a steel structure or be manufactured of fiber-reinforced composite.

In a preferred embodiments a main machinery component that is not supported onto a load-carrying frame part as the load-carrying structure can simply be secured directly to the wall of the composite nacelle cover by means of securing means, such as bolts and brackets, and preferably secured at wall points being predetermined by calculations based on models and tests to be particular strong securing points. Thus securing main machinery components to the wall of the composite nacelle cover provides options for securing said main machinery component.

A 3-Dimensional structure of composite nacelle cover that is especially for carrying the load of the machinery components may have substantially flat and straight walls, thus walls without any substantially curving. Optionally such a composite nacelle cover may have a substantially rectangular appearance with a substantially square cross-section.

The present invention also relates to a wind turbine comprising a tower and a nacelle at the top of the tower. The wind turbine comprises the composite nacelle cover described above and being equipped with main machinery components secured to the wall of the composite nacelle cover without using a load-carrying frame, including not using one or more of a part of a front frame, a part of a rear frame, the entire front frame, and/or the entire rear frame thereby substantially reducing overall weight of the nacelle and making the installation of the first part of main machinery components fast and easy. The composite nacelle cover may be secured directly to the top of the tower.

As an example within the scope of the present invention it is intended to reduce the length of the conventional load-carrying frame by about one third. For a main frame weighing about 25 tons about 7 tons of steel and about 300 bolts may be saved.

BRIEF DESCRIPTION OF THE DRAWINGS

The invention will now be described by way of example with references to the accompanying drawing, in which FIG. 1 is a principle sketch in a perspective side view of a conventional embodiment of a composite nacelle cover provided with a first embodiment of a load-carrying frame;

FIG. 2 shows the same modified in accordance with the present invention;

FIG. 3 shows the same even further modified in accordance with the present invention;

FIG. 4 is a principle sketch in a perspective side view of another conventional embodiment of a composite nacelle cover provided with a second embodiment of a load-carrying frame;

FIG. 5 shows the same modified in accordance with the present invention;

FIG. 6 shows the same even further modified in accordance with the present invention;

FIG. 7 shows the embodiment of FIG. 6 with two components of the first part of the main machinery components secured to the wall of the composite nacelle cover, and not to the load-carrying frame;

FIG. 8 is a schematic perspective side view from above of a nacelle cover for a wind turbine in accordance with a further embodiment of the present invention;

FIG. 10 is a schematic cross-section along line A of the nacelle cover of FIG. 8 showing an assembly of wall elements forming a housing of the nacelle cover;

FIGS. 11*a* and 11*b* are schematic cross-sections along line B of opposite-sided parts of the roof and sidewalls of the nacelle cover of FIG. 8 illustrating opposite locating mechanisms between the roof and sidewalls of the nacelle cover;

FIGS. 15, 16 and 17 are, respectively, schematic side views of the inner (B) surface, transverse side edge and outer (A) surface of the wall element of the nacelle cover of FIG. 8;

FIG. 23 is a schematic side view of a nacelle cover for a wind turbine in accordance with a further embodiment of the present invention in an unloaded state;

FIG. 24 is a schematic side view showing the nacelle cover of FIG. 23 in a loaded state.

DETAILED DESCRIPTION

Figure 9:
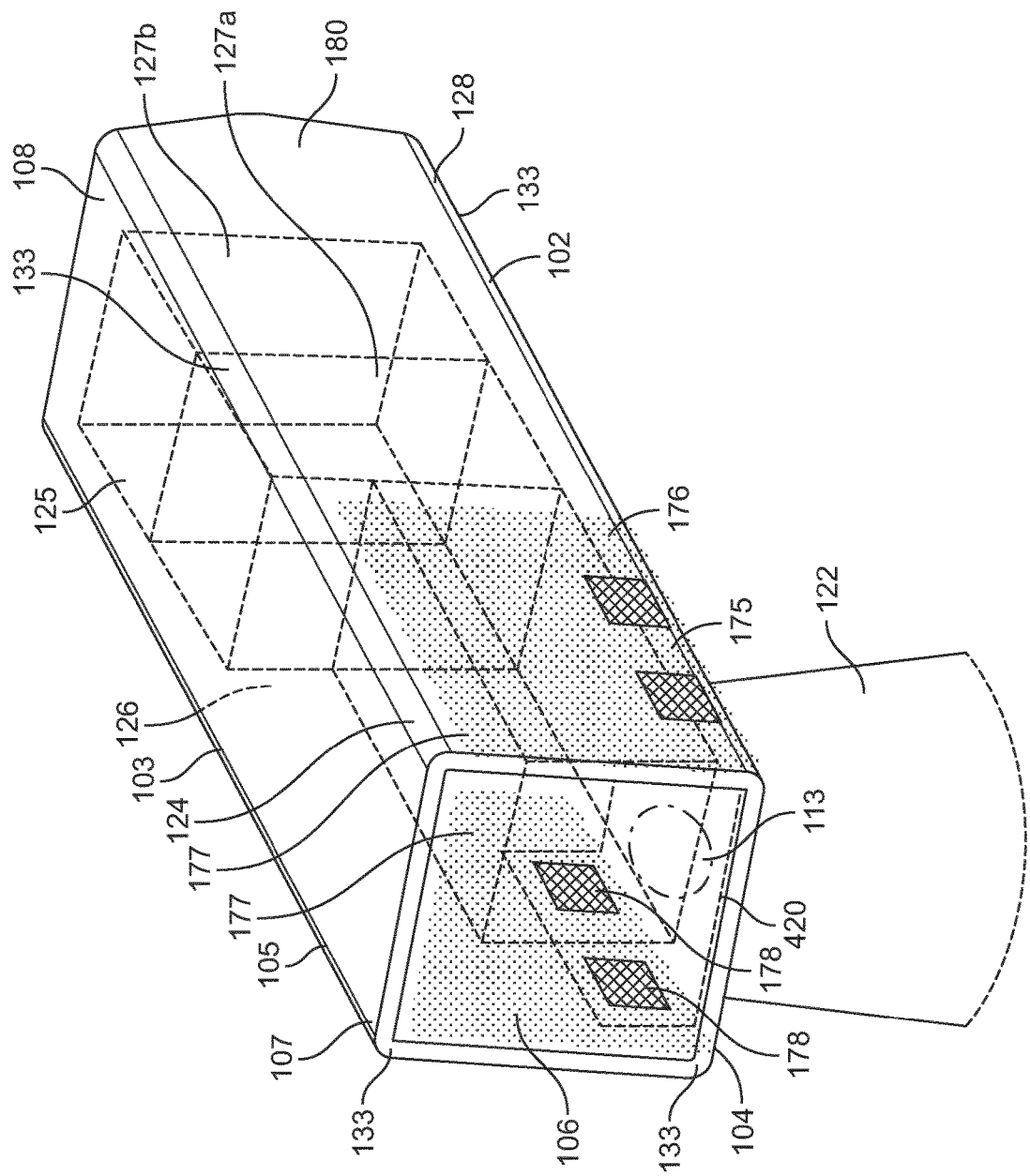
FIG. 9 is a schematic perspective side view from above of the structural design of the nacelle cover of FIG. 8.

In the FIGS. 1-7 a longitudinal side wall of the composite nacelle cover has been left out only for illustrative purposes.

Emphasis is also added that in the figures the components of the first part of the main machinery components are only shown schematically as examples and that the second part of the main machinery components are left out. Furthermore no bolts or bracket are shown as the securing means in the figures. It is however emphasized that such securing means are present. The composite nacelle cover shown in figures is embodiments of composite nacelle cover in accordance with the applicant's International patent application no. WO2019/034214. Other designs of composite nacelle covers are within the scope of the present invention and the example shown in the figures is not exhaustive of the models and embodiments of composite nacelle covers that can implement and utilize the present invention. Also the designs of load-carrying frames shown in the figures are only examples, and load-carrying frames of multiple designs can be reduced in size, or be manufactured with reduced size for the purpose of the present invention.

When a main machinery component, whether it being the first part, the second part or both said parts, is secured to a sidewall of the composite nacelle cover this should not be construed as limiting the scope of the present invention. Such a component could quite as well be secured to the floor, end walls, or even to the roof, although not to the hatch.

The first embodiment of a composite nacelle cover 1 shown in FIG. 1 is a first embodiment of a composite nacelle cover in accordance with the applicant's International patent application no. WO2019/034214 assembled of plural panel-sub elements 2 of fiber-reinforced composite laminate, wherein opposite plastic face skins laminates a foam core. The plural panel-sub-elements 2 of fiber-reinforced composite laminate are assembled into flat walls, and thus better suited for suspending of machinery components, or any other items, than curved walls.

The composite nacelle cover 1 thus has six flat walls: a floor 3, a roof 4, opposite flat sidewalls 5, an inclined front end wall 6, and an inclined rear end wall 6, which walls delimit an interior space 7 for accommodating a conventional first embodiment of a load-carrying frame 8 supporting a first part 9*a*; 9*b* of the main machinery components and a second part of the main machinery components (not shown, but the general position is indicated by reference numeral 10).

The floor 3 has a bottom hole 11 for securing the composite nacelle cover 1 in accessible communication with the tower (not shown) of the wind turbine (not shown) to provide access to the nacelle inner from the tower. The yaw system (not shown) of the wind turbine is located in the vicinity of the bottom hole 11.

The inclined front end wall 6 has a front hole 12 for securing the rotor (not shown).

The load-carrying frame 8 has a front frame part 13 terminating in a frame front end 14 and an opposite rear frame part 15 terminating in a frame rear end 16. The load-carrying frame 8 is a steel framework 17 of very simple design, in that the steel framework 17 is in the form of a latticework composed of horizontal steel beams 18 and vertical steel beams 19 defining rows of squares 20 along the walls 3,4,5,6 of the composite nacelle cover 1, some of which squares 20 have yet a diagonal steel beam 21 for further structural reinforcement. The load-carrying frame 8 rests on the floor 3 and is secured at appropriate securing points to any of the walls 3,4,5,6 of the composite nacelle cover 1 using bolts (not shown) and brackets (not shown).

The first part 9a; 9b of the main machinery components are illustrated as square boxes, but can typically be a transformer 9b and an electrical cabinet 9a.

The first embodiment of a load-carrying frame 8 has no well-defined distinction between the front frame part 13 and the rear frame part 15 that specifically serves as a distinct bed plate frame and main frame, respectively.

The length of the first embodiment of a load-carrying frame 8 is easily modified within the scope of the present invention.

In the first modification of the first embodiment of a load-carrying frame 8 seen in FIG. 2, a fifth of the length of the load-carrying frame 8 seen in FIG. 1 has been eliminated and one machinery component 9a of the first part 9a;9b of machinery components has been secured to the side wall 5 or to the floor 3 instead of to a load-carrying frame 8. The rear frame part 15 has been partly removed.

In the second modification of the first embodiment of a load-carrying frame 8 seen in FIG. 3, two fifth of the length of the load-carrying frame 8 seen in FIG. 1 has been eliminated and both machinery components 9a;9b of the first part 9a;9b of machinery components are now secured to the side wall 5 or to the floor 3 instead of to a load-carrying frame 8. The rear frame part 15 has been fully removed. The side wall 5 or the flow 3 of the composite nacelle cover 1 now serves as the load-carrying structure and two fifth of the metal for the load-carrying frame has been saved.

The nacelle cover 22 shown in FIGS. 4-7 is a second embodiment of a composite nacelle cover 1 in accordance with the applicant's International patent application no. WO2019/034214. The second embodiment of a nacelle cover 22 is substantially identical to first embodiment of a nacelle cover 1 seen in FIGS. 1-3 and for like parts same reference numerals are used.

The second embodiment of a composite nacelle cover 22 accommodates a second embodiment of a load-carrying frame 23 that has a front frame part 24 in the form of a bed plate frame 25 to support the drive train (not shown), and an opposite rear frame part 26 in form of a main frame 27. The shown second embodiment of a load-carrying frame 23 is known in the art.

In the first modification of the second embodiment of a load-carrying frame 22 seen in FIG. 5, about a third of the length of the main frame 27 seen in FIG. 4 has been eliminated to allow machinery components of the first part of machinery components to be secured to the wall of the composite nacelle cover 22 instead of to the main frame 27.

In the second modification of the second embodiment of a load-carrying frame 23 seen in FIG. 6, the main frame 27 seen in FIG. 4 has been eliminated in its entirety leaving only the bed plate frame 25, which is intended to support the second part of the main machinery components of the wind turbine. Both the drive train and the generator can be supported on the load-carrying bed plate frame 25.

However as seen in FIG. 7 the first part 9a;9b of the main machinery components are suspended to the side wall 5 of the nacelle cover 22 eliminating the function and use of the main frame 27. A main frame 27 conventionally takes up space and this space can either be used for supporting other equipment of machinery, but the length of the nacelle cover can also be shortened. A lot of weight of the overall nacelle structure is also eliminated.

The generator (not shown) may in the alternative be placed directly on the floor 3 of the composite nacelle covers 1; 22 instead of the being supported by a load-carrying frame 8; 23.

Due to the conventional, traditional practice of using a metal load-carrying frame as an indispensable complete load-carrying structure for all main machinery components, the applicant attempts any prejudices against utilizing the wall of the composite nacelle cover by a gradual conversion to non-use of load-carrying frame for the main machinery components of a nacelle. Thus a gradual reduction of the length of the load-carrying frame is intended within the scope of the present invention, optionally until no load-carrying frame is no longer present.

Referring to FIGS. 8 to 22, there is illustrated a nacelle cover 100 for a wind turbine in accordance with a further embodiment of the present invention, and a method of joining wall elements of such a nacelle cover 100.

Referring first to FIGS. 8, 9 and 10, the nacelle cover 100 comprises a roof 101, opposite sidewalls 102, 103 and a floor 104 assembled together to form a composite material elongate housing 105 defining an interior space 106. As described above for the previous embodiments, the interior space 106 in use contains machinery components (not shown) of the wind turbine (not shown). For example, in a typical wind turbine, the hub is secured to the front of the nacelle cover 100 with the blades directly bolted to the hub, or bolted to the hub via a pitch bearing. In the embodiment of the present invention, the yaw system, mainshaft bearing, gearbox, generator, transformer and electrical control cabinets are behind the hub and mounted within the nacelle cover 100.

The housing 105 has a front end 107 for mounting to a tower (not shown) of the wind turbine (not shown), and an opposite rear end 108. An inclined front end wall 109, preferably flat, has a front hole 110 for securing the rotor (not shown) of the wind turbine. A rear end wall 111 closes the rear end 108. In the illustrated embodiment the rear end wall 111 has two inclined faces forming a convex outer surface but may have any other desired shape and configuration.

The roof 101 is typically provided with one or more detachable panels 112 to enable the panels to be removed temporarily after installation of the wind turbine when it is required to replace any of the machinery components mounted within the nacelle cover. It is conventional to use a crane to access the interior space 106 via the roof 101 by removing one or more detachable panels 112 from the roof 101.

The floor 104 has a bottom hole 113 for securing the nacelle cover 100 in accessible communication with the tower (not shown) of the wind turbine (not shown) to provide access to the interior space 106 of the nacelle cover 100 from the tower. A yaw system (not shown) of the wind turbine is typically located in the vicinity of the bottom hole 113.

Each of the roof 101, the opposite sidewalls 102, 103 and the floor 104 comprise a fibre-reinforced polymer composite material. Preferably, each of the front end wall 109 and the rear end wall 111 also comprise a fibre-reinforced polymer composite material.

Each of the roof 101, the opposite sidewalls 102, 103 and the floor 104 comprise a respective wall element 114, 115, 116, 117 comprising an assembly of a plurality of panels 118, 119, 120, 121 which have been joined together to form an respective elongate row 122, 123, 124, 125 of panels. Each panel 118, 119, 120, 121 comprises fibre-reinforced polymer composite material. Preferably, each of the front end wall 109 and the rear end wall 111 also comprise an assembly of a plurality of panels comprised of a fibre-reinforced polymer composite material.

In the illustrated embodiment, the wall elements 115, 116 of the opposite sidewalls 102, 103 are flat, and consequently the opposite sidewalls 102, 103 are flat. The opposite sidewalls 102, 103 can be assembled from identical flat wall elements 115, 116.

Also, the wall elements 114 of the roof 101 are flat or upwardly bowed about a radius of curvature within the range of from infinity to 16 m. Consequently, the roof 101 is flat or upwardly bowed. An upwardly bowed surface assists run-off of rain and sliding of snow from the roof 101 to minimise excess snow loads on the nacelle cover 100 during winter weather conditions. The wall element 117 of the floor 104 is flat, or alternatively downwardly bowed about a radius of curvature within the range of from infinity to 16 m. When the roof 101 and/or floor 104 are flat, the roof 101 and/or floor 104 can be assembled from identical flat wall elements 114, 117 which are also identical to the flat wall elements 115, 116 used for the opposite sidewalls 102, 103. When the roof 101 and floor 104 are bowed, the roof 101 and floor 104 can be assembled from identical bowed wall elements 114, 117.

In accordance with one aspect of the present invention, the front end 107 of the housing 105 is mounted on a bed plate frame 420, shown highly schematically by dashed lines in FIG. 9. The bed plate frame 420 is affixed to the tower 122 as is conventional to those skilled in the art of wind turbine manufacture and construction.

The bed plate frame 420 supports at least one part of a drive train 124 of the wind turbine, the drive train being shown highly schematically by a box composed of dashed lines in FIG. 9.

At least one machinery component 125, again shown highly schematically by a box composed of dashed lines in FIG. 9, is mounted on the inner surfaces 126 of the opposed sidewalls 102,102 of the housing 105 at a position laterally spaced from the bed plate frame 420 in a longitudinal direction along the housing 105. The at least one machinery component 125 is part of, or mechanically and/or electrically connected to, the drive train 124.

In a typical embodiment of the present invention, the yaw system and the mainshaft bearing are mounted on the bed plate frame 420 and the gearbox, generator, transformer and electrical control cabinets mounted to the sidewalls 102, 103 within the nacelle cover 100 as described in greater detail hereinbelow. However, other arrangements of which machinery components are mounted on the bed plate frame 420 and the sidewalls 102, 103 may be employed provided that any additional steel framework, i.e. additional to the nacelle housing 105, for mounting any of the machinery components is avoided.

In the preferred embodiment of the present invention, the two machinery components that are typically located the furthest rearmost distance from the front end 107 of the nacelle housing 105, e.g. the generator 127a of the drive train and the transformer 127b, are mounted on the sidewalls 102, 103.

The machinery component(s) may be directly mounted on the sidewalls 102, 103, using fitting mechanisms between the machinery component(s) and the sidewalls 102, 103. Alternatively, the machinery component(s) may be indirectly mounted on the sidewalls 102, 103, for example by using a reinforced area of the floor 104 which is fitted to the sidewalls 102, 103, a transverse an additional reinforced interior floor which is fitted to the sidewalls 102, 103, or a transverse support assembly which is fitted to the sidewalls 102, 103, for example transverse beams mounted between the sidewalls 102, 103, which is fitted directly to the sidewalls 102, 103, and mounting the machinery component(s) on the reinforced area of the floor 104, additional reinforced interior floor, or support assembly. In each of these constructions, the mass and turning moment load of the machinery component(s) are supported by the sidewalls 102, 103.

The housing 105 comprises a structural tube 128 which functions as a vertically displaceable cantilever beam carrying the load of the at least one machinery component 125 mounted thereon.

The at least one machinery component 125 is directly or indirectly mounted on the sidewalls 102, 103 of the housing 105 and the sidewalls 102,103 of the housing 105 directly or indirectly support the load of the at least one machinery component 125.

Accordingly, preferably the generator 127a of the drive train and/or the transformer 127b of the wind turbine are directly mounted on the sidewalls 102, 103 of the housing 105 at respective positions along the housing 105 laterally spaced from the bed plate frame 420 and the sidewalls 102, 103 of the housing 105 directly support the load of the generator 127a and the transformer 127b at the respective positions. As can be seen from FIG. 9, typically the transformer 127b of the wind turbine is directly mounted on the sidewalls 102, 103 of the housing 105 at the rear end 108 of the housing.

In alternative embodiments, one or more other machinery components, in particular one or more components of the drive train, are mounted directly or indirectly to the sidewalls 102, 103 of the housing 105.

In further alternative embodiments, as shown in FIGS. 4 and 5, a rear frame part, such as rear frame part 26, may be affixed to the bed plate frame 420 and extends rearwardly of the bed plate frame 420 within the housing 105. At least one said machinery component of the drive train may be mounted on the rear frame part. The weight of the machinery component(s) of the drive train mounted on the rear frame part is carried by, and transferred to the tower 122 by, the bed plate frame 420.

The machinery component(s) 125 that are mounted on the sidewalls 102,103 at a position laterally remote from the bed plate frame 420 have significant mass, typically a total of at least 1 tonne, and thereby exert a significant turning moment on the structural tube 128 which functions as a cantilever beam to support the load of the combination resulting from both the mass of the machinery component(s) 125 that are mounted on the sidewalls 102,105 and the mass of the portion of the housing 105 that is rearward of the tower 122, and in particular the bed plate frame 420 fitted thereto.

Referring to FIG. 10, the roof 101, opposite sidewalls 102, 103 and floor 104 are assembled at each longitudinally-extending corner 129, 130, 131, 132 of the housing 105 by at least one respective fixing mechanism 140 to form a structural joint 133 at least partially along the respective longitudinally-extending corner 129, 130, 131, 132.

As a result of this construction, the opposite sidewalls 102, 103 function as opposite load-bearing webs of the vertically displaceable cantilever beam to carry the turning moment load, of the housing 105 and the at least one machinery component 125 mounted on the housing 105, the turning moment being about the mounting to the bed plate frame 420. Furthermore, at least one or both of the roof 101 and floor 104 function as a respective flange of the vertically displaceable cantilever beam interconnecting the opposite load-bearing webs of the vertically displaceable cantilever beam. Accordingly, the vertically displaceable cantilever beam functions to support the vertical turning moment load in a manner similar to an I-beam, with the opposite sidewalls 102, 103 functioning as opposite load-bearing webs and the roof 101 and/or the floor 104 functioning as flanges.

The structural tube 128 is thereby configured to resist a vertical load of at least 500 kN, and a vertical bending moment of at least 3500 kNm, applied to the housing 105 at a position laterally of the mounting between the front end 107 of the housing 105 and the bed plate frame 420 which is affixed to the tower 122.

In some embodiments, any of the roof 101, sidewalls 102, 103 and floor 104 may be provided with large openings covered by removable panels which can be temporarily opened to access the interior space 106. When such large openings are provided, the opposite wall element may be reinforced to enable that reinforced element to function as the flange of the respective cantilever beam. For example, when the roof 101 is provided with a large openable hatch to enable a crane to remove machinery components from the housing 105, the floor 104 may be reinforced to function as the flange of the vertically displaceable cantilever beam and/or the upper edges of the sidewalls 102, 103 may be reinforced to provide a respective top flange structure for each sidewall 102, 103.

Correspondingly, the roof 101 and floor 104 function as opposite load-bearing webs of a horizontally displaceable cantilever beam to carry a lateral load, for example a wind load and/or a yawing load applied to the housing 105 about the mounting to the bed plate frame 420. Accordingly, the horizontally displaceable cantilever beam functions to support the horizontal turning moment resulting from an applied lateral wind load in a manner similar to an I-beam, with the roof 101 and floor 104 functioning as opposite load-bearing webs of the horizontally displaceable cantilever beam and the opposite sidewalls 102, 103 functioning as flanges of the horizontally displaceable cantilever beam interconnecting the opposite load-bearing webs of the horizontally displaceable cantilever beam.

The structural tube 128 is thereby configured to resist a horizontal lateral load of at least 100 kN, and a horizontal bending moment of at least 1200 kNm, applied to the housing at a position laterally of the mounting between the front end 107 of the housing 105 and the bed plate frame 420 which is affixed to the tower 122.

Each of the roof 101, the opposite sidewalls 102, 103 and the floor 104 comprises a respective wall element 114, 115, 116, 117 having opposite longitudinal edges 134, 135 extending between the front and rear ends 107, 108. The longitudinal edges 134, 135 of adjacent wall elements 114, 115, 116, 117 of the housing 105 comprise respective longitudinal flanges 136, 137 which are inwardly inclined relative to the respective wall element 114, 115, 116, 117.

At each longitudinally-extending corner 129, 130, 131, 132 of the housing 105, the respective adjacent flanges 136, 137 of the wall elements 114, 115, 116, 117 comprise an outer flange 136 and an inner flange 137 which are affixed together in an overlapping relationship by the fixing mechanism 140 to form the structural joint 133 along the respective longitudinally-extending corner 129, 130, 131, 132.

Typically the outer and inner flanges overlap by at least 50 mm, preferably at least 70 mm, for example any distance from 70 to 150 mm.

Along opposite edges of the roof 101, the flanges 136 of the roof wall element 114 form the outer flanges 136 and the flanges of the respective opposite sidewall elements 115, 116 form the inner flanges 137. Additionally, along opposite edges of the floor 104, the flanges 137 of the floor wall element 117 form the inner flanges 137 and the flanges 136 of the respective opposite sidewall elements 102, 103 form the outer flanges 136.

Each of the outer and inner flanges 136, 137 are inclined at an angle within the range of from 30 to 60 degrees, optionally 45 degrees, to a wall part 142 of the respective wall element 114, 115, 116, 117.

Preferably, the structural joint 133 along each longitudinally-extending corner 129, 130, 131, 132 has a shear strength, in a plane parallel to the respective outer and inner flanges 136, 137, of more than 120 kN/m.

Each wall element 114, 115, 116, 117 comprises the wall part 142 comprising, or preferably consisting of, a fibre-reinforced polymer composite material defining outer and inner surfaces of the wall element 114, 115, 116, 117. The flanges 136, 137 of the wall element 114, 115, 116, 117 are integral with the wall part 142. Alternatively, the flanges 136, 137 of the wall element 114, 115, 116, 117 may be affixed to the wall part 142, for example by an adhesive layer (not shown).

A plurality of parallel structural beams 183 are integrally moulded with, or affixed to, the wall part 142 on the inner surface of the wall element 114, 115, 116, 117, wherein the structural beams 183 extend in a direction orthogonal to the opposite longitudinal edges 134, 135 of the wall element 114, 115, 116, 117.

As shown in FIG. 10, for each wall element 114, 115, 116, 117, the structural beams 183 are integrally moulded with, or affixed to, each flange 137 of the respective wall element 114, 115, 116, 117 which forms an inner flange 137 in the housing 105. In the wall elements 115, 116 of the opposite sidewalls 102, 103, the structural beams 183 are integrally moulded with, or affixed to, the upper flange 137 of the wall element 115, 117. In the wall element 116 of the floor 104, the structural beams 183 are integrally moulded with, or affixed to, the opposite flanges 137 of the wall element 116.

Figure 14:
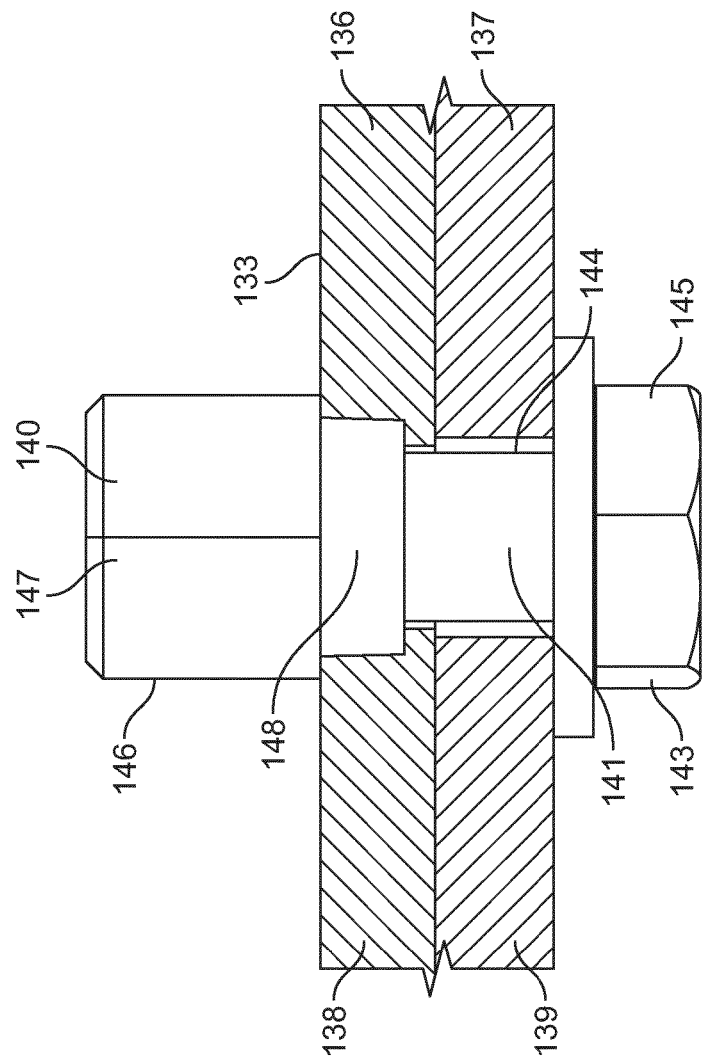
FIG. 14 is a schematic side view, partly in cross-section, of the nut of FIG. 13 in a threaded bolt and nut assembly when used or affixing together flanges of the wall elements of the nacelle cover of FIG. 8.
Figure 13:
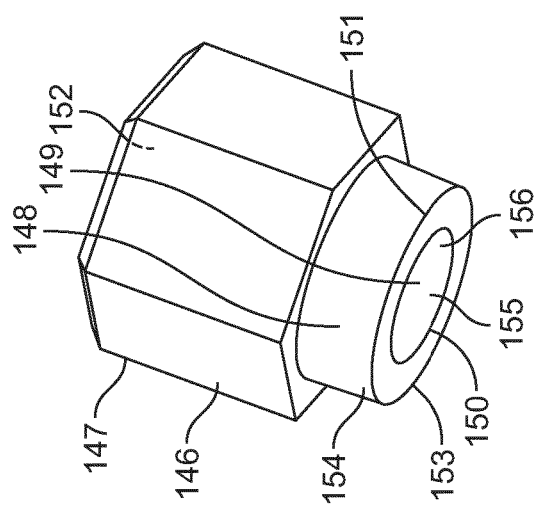
FIG. 13 is a schematic perspective side view from below of a nut for affixing together flanges of the wall elements of the nacelle cover of FIG. 8.

In the preferred embodiment, as shown in FIGS. 13 and 14, the fixing mechanism 140 comprises a threaded bolt and nut assembly 143. The pair of outer and inner flanges 136, 137 have respective longitudinally-extending opposed facing surfaces 138, 139 which define a pair of opposed load bearing surfaces of the structural joint 133. The fixing mechanism 140 comprises a mechanical element 141 which extends through the thickness of the pair of outer and inner flanges 136, 137 at the pair of opposed load bearing surfaces 138, 139. The bolt 144 extends through the thickness of the pair of outer and inner flanges 136, 137, and a head 145 of the bolt 144, with an optional washer, and the nut 146 are on opposite sides of the pair of flanges 136, 137.

However, other fixing mechanisms may alternatively be employed, for example rivets. Alternatively or in addition, the opposed facing surfaces 138, 139 may be bonded together by an adhesive layer provided therebetween. Furthermore, in other embodiments a gasket may be disposed between the pair of outer and inner flanges 136, 137.

The embodiment of FIGS. 13 and 14 comprises a particular construction of the nut 146 which can be pre-joined to the outer flange 136 and remain securely connected thereto in the absence of the bolt 144, which simplifies the assembly process of the housing 105 by permitting the fixing mechanism 140 to be installed with access only from the interior space 106 of the housing 105.

The nut 146 comprises a head part 147 having a hexagonal outer surface for engagement by a wrench, an integral shaft part 148 adjacent to the head part 147, and a cylindrical blind bore 149 which extends longitudinally along the shaft part 148. The blind bore 149 has an open end 150 at a free end 151 of the shaft part 148 and a closed end 152 within the nut 146, typically within the head part 147. The shaft part 148 has an external surface of rotation 153 with a first helical thread 154 and the blind bore 149 has an internal cylindrical surface 155 with a second helical thread 156. The first and second helical threads 154, 156 have opposite rotational directions.

The external surface of rotation 153 of the shaft part 148 is frustoconically tapered and reduces in radius in a direction towards the free end 151. Typically, the frustoconically tapered surface 153 has a taper angle of from 1 to 5 degrees, optionally from 1 to 2 degrees, relative to a longitudinal axis of the shaft part 148.

The external surface 153 of the shaft part 148 is threadably screwed, in one rotational direction, typically an anticlockwise or reverse rotational direction, into one of the outer and inner flanges 136, 137, preferably the outer flange 136, by the first helical thread 154. The tapered external surface 153 of the shaft part 148 securely fits the nut 146 onto the outer flange 136. An adhesive, for example an epoxy resin adhesive, may also be provided between the external surface 153 and the outer flange 136 to enhance the strength and durability of the bond.

The bolt 144 extends through a pre-drilled hole 157 in the pair of flanges 136, 137 from the other of the outer and inner flanges 136, 137 and is threadably screwed, in the opposite rotational direction, typically a clockwise or forward rotational direction, into the blind bore 149 to securely affix together the pair of flanges 136, 137.

By providing that the nut 146 is threadably screwed into the outer flange 136 by the first helical thread 154, and the bolt 144 extends outwardly through the pair of flanges 136, 137 from the inner flange 137, the wall elements comprised of a fibre-reinforced polymer composite material can be assembled together, disassembled, and re-assembled, from the interior space 106.

Figure 12:
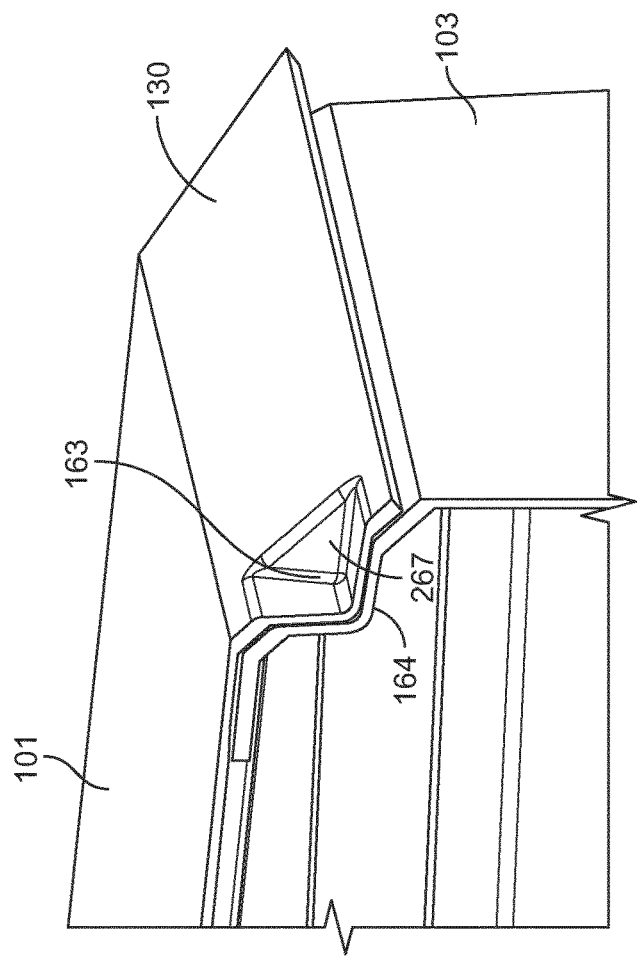
FIG. 12 is an enlarged schematic cross-sectional perspective view along line B-B illustrating in greater detail one of the locating mechanisms between the roof and a respective sidewall of the nacelle cover shown in FIG. 11*b*.
Figure 11B:
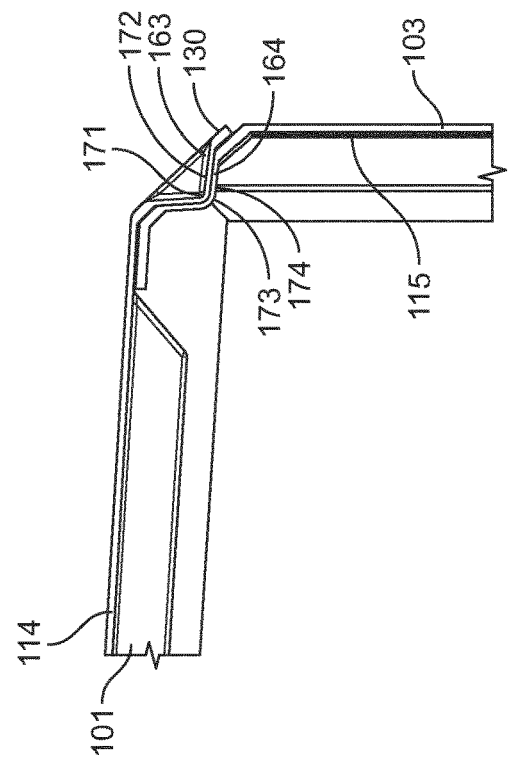

In accordance with a further aspect of the present invention, as described with reference to FIGS. 8, 11 and 12, a locating mechanism is provided between the wall elements to assist assembly of the housing 105.

At the pair of longitudinally-extending corners 129, 130 of the housing 105 extending along opposite edges of the roof 101, the flanges 136 of the roof wall element 114 and the flanges 137 of the respective opposite sidewall elements 115, 116 comprise a locating mechanism 160 for positioning the flanges 136, 137 of the roof wall element 114 and the flanges of the respective opposite sidewall elements 115, 116 at respective predetermined interlocked positions.

The flanges 136 of the roof wall element 114 comprise a first locating element 161 and the flanges 137 of the respective opposite sidewall elements 115, 117 comprise a second locating element 162. The first and second locating elements 161, 162 are configured to interlock together at the predetermined interlocked position.

The first locating element 161 in the roof wall element 114 comprises a projection 163 and the second locating element 162 in the respective opposite sidewall elements 115, 116 comprises a socket 164. Alternatively, the first and second locating elements 161, 162 may comprise a socket and a projection respectively.

The projection 163 and the socket 164 have complementary inwardly tapering surfaces 165a, 165b, 166a, 166b whereby the projection 163 is configured to self-align towards the predetermined interlocked position within the socket 164 as the projection 163 and the socket 164 are progressively engaged together, i.e. when the roof wall element 114 is lowered onto the respective opposite sidewall elements 115, 116.

The projection 163 comprises a first inwardly extending integral part 167 of the wall 168 of the outer flange 136 and the socket 164 comprises a second inwardly extending integral part 169 of the wall 170 of the inner flange 137.

The projection 163 therefore comprises first and second longitudinally-extending planar surfaces 1665a, 165b which are each inclined to the outer flange 136 and converge to form a longitudinally-extending outer edge 171 forming a tip 172 of the projection 163. The socket 164 correspondingly comprises third and fourth longitudinally-extending planar surfaces 166a, 166b which are each inclined to the inner flange 137 and converge to form a longitudinally-extending inner edge 173 forming a lowermost part 174 of the socket 164.

The first and second longitudinally-extending planar surfaces 1665a, 165b are inclined to each other by an obtuse angle, and the third and fourth longitudinally-extending planar surfaces 166a, 166b are inclined to each other by the obtuse angle, which is the same angle.

The projection 163 has a pair of opposed transversely-extending end walls 267 which define the length of the projection 163 extending along the longitudinal direction of the nacelle cover 100, and correspondingly the socket 164 has a pair of opposed transversely-extending end walls (not shown) which define the length of the socket 164. The socket 164 is slightly longer than the projection 163 so that in the predetermined interlocked position each end wall 267 of the projection 163 is inwardly adjacent to a respective end wall of the socket 164. Accordingly, the projection 163 and the socket 164 longitudinally, and thereby horizontally, position the roof wall element 114 relative to the respective sidewall element 115, 116 in the predetermined interlocked position. The projection 163 and the socket 164 typically have a length, extending along the longitudinal direction of the nacelle cover 100, of from 100 to 150 mm.

In the predetermined interlocked position, the first and third longitudinally-extending planar surfaces 165a, 166a are adjacent to each other, and the second and fourth longitudinally-extending planar surfaces 165b, 166b are adjacent to each other. Additionally, the first and third longitudinally-extending planar surfaces 165a, 166a are substantially vertically oriented and thereby horizontally position the roof wall element 114 relative to the respective sidewall element 115, 116. Furthermore, the second and fourth longitudinally-extending planar surfaces 165b, 166b are substantially horizontally oriented and thereby vertically position the roof wall element 114 relative to the respective sidewall element 115, 116.

Preferably, a plurality of the locating mechanisms 140 are interspaced along the length of each of the pair of longitudinally-extending corners 129, 130 of the housing 105 extending along opposite longitudinal edges 134, 135 of the roof 101. Alternatively, along the roof 101 there may only be provided a first locating mechanism 140 at the front end 107 of the housing 105 and a second locating mechanism 140 at the rear end of the housing 105.

Referring to FIGS. 8 and 9, the opposite sidewalls 102, 103 are provided with a fibre-reinforced polymer composite material reinforcement 175 at opposite regions 176 of the sidewalls 102, 103 at which the front end 107 of the housing 105 is mounted on the bed plate frame 420.

The reinforcement 175 comprises a reinforced sidewall portion 177 which constitutes an integral part of the sidewall 102, 103, and at least one integral bracket region 178 which constitutes an integral part of the sidewall 102, 103. The bracket region 178 is disposed within a surface area of, and at least partly surrounded by, or wholly surrounded by, the respective reinforced sidewall portion 177.

The reinforced sidewall portion 177 extends from the front end 107 of the housing 105 in a direction towards the rear end 108 of the housing 105 and defines at least 20% of the length of the respective sidewall 102, 103 and extends from the floor 104 of the housing 105 in a direction towards the roof 101 of the housing 105 and defines at least 50% of the height of the respective sidewall 102, 103.

Between the reinforced sidewall portion 177 and the rear end 108 of the housing 105, the opposite sidewalls 102, 103 comprise a respective rear wall portion 180.

Figure 18:
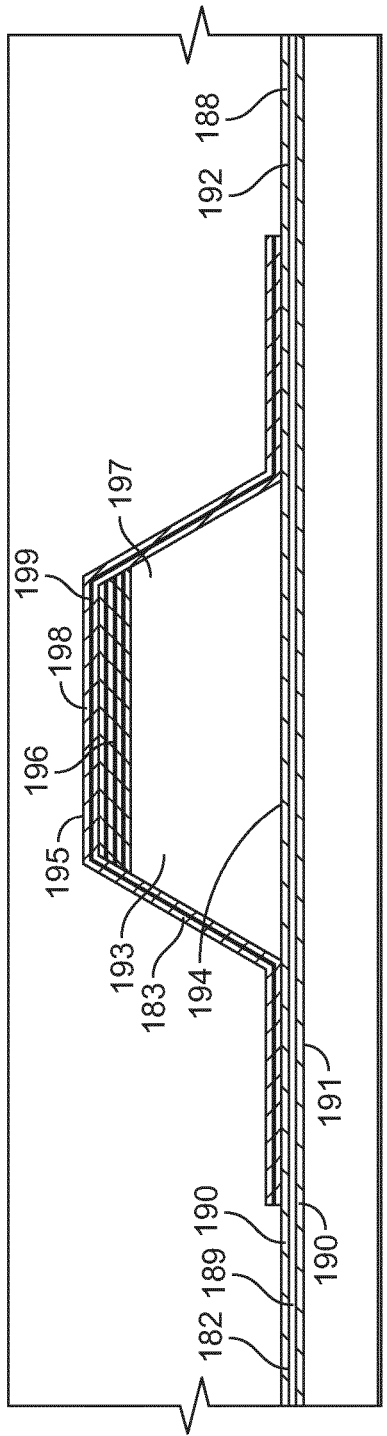
FIG. 18 is a schematic cross-section through a wall part and an integral structural beam of the wall element of the nacelle cover of FIG. 8.

A panel 181 for forming the rear wall portion 180 of the sidewalls 102, 103 is shown in FIGS. 15 to 17. FIG. 18 shows a cross-section through part of the panel 181. Moreover, the same panel structure is used for the roof 101 and the floor 104.

As described hereinbelow, a plurality of panels 181 are joined together as a row of panels 181 to form, respectively, the wall elements 115, 116, 114, 117 of the sidewalls 102, 103, the roof 101 and the floor. Identical panels are used to form the rear wall portions 180, and the same identical panels may also optionally form the roof 101 and floor 104 when the roof and floor are flat, like the sidewalls 102, 103. If the roof 101 and/or floor 104 are curved, then curved panels having a similar structure are employed for the roof 101 and floor 104, the difference being the curved shape rather than a planar shape.

The panel structure of the rear wall portions 180 of the sidewalls 102,103, the roof 101 and the floor 104 are illustrated in FIGS. 15 to 18. The panel 181 comprises a planar wall part 182 and structural beams 183 on the inner surface 184 of the panel 181.

The panel of the reinforcement 175, comprising the reinforced sidewall portion 177 and the bracket region 178, has a similar structure, and comprises a planar wall part and structural beams on the inner surface of the panel, with the modification that the planar reinforced sidewall portion 177, the planar bracket region 178, and the structural beams extending over the planar reinforced sidewall portion 177 and the planar bracket region 178, are reinforced as compared to the planar wall part 182 and structural beams 183.

As shown in FIGS. 15 to 18, the panel 181 to form the rear wall portion 180, and optionally also the roof 101 and the floor 104, comprises the wall part 182 comprising a fibre-reinforced polymer composite material. A plurality of parallel structural beams 183 are integrally moulded with the wall part 182 on the inner surface 184 of the panel 181. Alternatively, the structural beams 183 may be affixed to the wall part 182. The structural beams 183 extend in a direction orthogonal to opposite longitudinal edges 186, 187 of the panel 181, which comprise the flanges 136, 137. In the housing 105, when the panel 181 is used to form the roof 101, the sidewalls 102, 103, and the floor 104, the longitudinal edges 186, 187 of the panel 181 extend along a longitudinal direction of the housing 105.

The wall part 182 comprises, and preferably consists of, the fibre-reinforced polymer composite material.

As shown in FIG. 18, in the wall part 182 the fibre-reinforced polymer composite material 188 comprises at least one first layer 189 of biaxial fibrous reinforcement. The first layer 189 biaxial fibrous reinforcement comprises fibres respectively oriented at an angle within the range of from +30 to +60 degrees, for example +45 degrees ±5 degrees, and within the range of from −30 to −60, for example −45 degrees ±5 degrees, to a longitudinal direction extending along the longitudinal direction of the panel 181. Each first layer 189 of biaxial fibrous reinforcement comprises glass fibres and has a total areal weight of from 1400 to 1800 g/m$^2$; the first layer 189 may comprise on or more plies of glass fabric.

The fibre-reinforced polymer composite material 188 further comprises at least one second layer 190 of fibrous reinforcement laminated on each side of the at least one first layer 189 of biaxial fibrous reinforcement. The second layer 190 of fibrous reinforcement comprises biaxial fibres respectively oriented at an angle of +0 degrees, ±5 degrees, and +90 degrees, ±5 degrees, to the longitudinal direction of the panel 181. Each second layer 190 of fibrous reinforcement comprises glass fibres and has an areal weight of from 1250 to 1650 g/m$^2$; the second layer 190 may comprise on or more plies of glass fabric.

Typically, one first layer 189 is sandwiched between two second layers 190, as shown in FIG. 18. Preferably, each surface, i.e. the outer "A" surface 191 and the inner "B" surface 192, of the wall part 182 is coated with a conventional gelcoat layer (not shown).

Typically, the wall part 182 has a total thickness of from 6 to 9 mm.

In the illustrated embodiment, the wall part 182 consists of a multilaminar fibre-reinforced resin matrix composite material, which provides the combination of high structural strength and a thin wall structure. In alternative embodiments, the wall part may consist of a sandwich structure, comprising a core layer of cellular material between outer and inner plies of the fibre-reinforced resin matrix composite material. Such a sandwich panel structure can provide enhanced structural strength but generally requires a thicker wall structure, for example a total wall thickness of from 10 to 25 mm.

Referring still to FIG. 18, the structural beam 183 comprises an elongate body 193 of a cellular core material having a cross-section in the shape of a trapezium. A lower face 194 of the elongate body 193, defining the larger width of the trapezium, is adjacent to the wall part 182. A second fibre-reinforced polymer composite material 195 covers the elongate body 193. The second fibre-reinforced polymer composite material 195 is preferably integrally moulded with the fibre-reinforced polymer composite material 188 of the wall part 182 thereby to sandwich the elongate body 193 between the fibre-reinforced polymer composite material of the wall part 182 and the second fibre-reinforced polymer composite material 195. Typically, the elongate body 193 of cellular core material has a thickness of from 40 to 100 mm.

In an alternative embodiment, the second fibre-reinforced polymer composite material 195 is adhered by an adhesive layer (not shown) to the fibre-reinforced polymer composite material 188 of the wall part 182.

In another alternative embodiment, the elongate body 193 of cellular core material is omitted, and a void 193 is present, for example a void having the same shape and configuration as the trapezium. The required flexural strength of the structural beam 183 may be achieved with or without the presence of a core material between the spaced multilaminar first and second fibre-reinforced polymer composite materials 188, 195.

The second fibre-reinforced polymer composite material 195 comprises at least one layer 196 of unidirectional fibrous reinforcement at least partly covering the elongate body 193, or above a void. The unidirectional fibrous reinforcement typically covers only the upper face 197 of the elongate body 193 or void defining the smaller width of the trapezium. The unidirectional fibres extend along the length of the structural beam 183. Typically, the unidirectional fibrous reinforcement comprises glass fibres, but other fibres may be used, for example carbon, Kevlar, natural fibres such as plant fibres, etc. Typically, the unidirectional fibrous reinforcement comprises a plurality of unidirectional glass fibre layers having a total areal weight of from 2500 to 4000 g/m$^2$.

The second fibre-reinforced polymer composite material 195 further comprises at least one third layer 198 of fibrous reinforcement transversely extending over the elongate body 193, or void, and laminated to the fibre-reinforced polymer composite material 188 of the wall part 182 adjacent to and along opposite transverse sides of the elongate body 193, or void. The third layer 198 of fibrous reinforcement comprises biaxial fibres respectively oriented at an angle of +0 degrees and +90 degrees to the longitudinal direction of the structural beam 183. The third layer 198 of fibrous reinforcement typically comprises glass fibres and has a total areal weight of from 2500 to 3600 g/m$^2$.

Preferably, the outer "B" surface 199 of the structural beam 183 is coated with a conventional gelcoat layer (not shown).

Typically, the second fibre-reinforced polymer composite material 195 covering the elongate body 193, or void, has a total thickness of from 3 to 10 mm.

Typically, the combination of the wall part 182 and the structural beam 183 has a total thickness of from 60 to 90 mm.

As described above, each of the roof 101 and the floor 104 comprise the same panel structure as the rear wall portion 180 of the sidewalls 102, 103.

Typically, the rear wall portion 180 of the sidewalls 102, 103, and optionally each of the roof 101 and the floor 104, has an in-plane shear strength of from 25 to 40 N/mm$^2$ and an in-plane compression strength of from 200 to 250 N/mm$^2$. Furthermore, preferably in the rear wall portion 180 of the sidewalls 102, 103, and optionally each of the roof 101 and the floor 104, each structural beam has a shear load strength of greater than 5 kN and a bending moment strength of greater than 6 kNm.

Turning again to the reinforcement 175, the layers of the wall part 182 as described above and shown in FIG. 18 are preferably also provided in the reinforced sidewall portion 177 and the bracket region 178, and the reinforced sidewall portion 177 and the bracket region 178 are further reinforced as compared to the wall part 182 by laminating additional layers of fibrous reinforcement to the multilaminar structure of the first fibre-reinforced polymer composite material 188.

In addition, the reinforced sidewall portion 177, and optionally the bracket region 178, are overlaid by structural beams that have a similar structure and arrangement as shown for the structural beams 183 on the inner surface 184 of the panel 181. However, the structural beams may optionally be further reinforced as compared to the structural beams 183 by laminating additional layers of fibrous reinforcement to the multilaminar structure of the second fibre-reinforced polymer composite material 195.

In summary therefore, as compared to the wall part 182, the reinforcement 175 has a further reinforced sidewall portion 177, a still further reinforced bracket region 178, and structural beams over the reinforced sidewall portion 177, and optionally the bracket region 178, which beams may optionally be further reinforced.

The fibre-reinforced polymer composite material of the reinforced sidewall portion 177 comprises, as compared to the wall part 182, at least two additional first layers of biaxial fibrous reinforcement comprising fibres respectively oriented at an angle of +45 degrees, ±5 degrees, and −45 degrees, ±5 degrees, and at least one additional second layer of fibrous reinforcement comprising biaxial fibres respectively oriented at an angle of +0 degrees, ±5 degrees, and +90 degrees, ±5 degrees, laminated on a side of the first layer of biaxial fibrous reinforcement. Typically, the first layers of biaxial fibrous reinforcement comprise glass fibres and have a total areal weight of from 4200 to 5400 g/m$^2$, and the second layers of fibrous reinforcement comprise glass fibres and have an areal weight of from 3750 to 5000 g/m$^2$. The reinforced sidewall portion 177 typically has a total thickness of from 10 to 16 mm.

The fibre-reinforced polymer composite material of the bracket region 178 comprises, as compared to the reinforced sidewall portion 177, at least two additional first layers of biaxial fibrous reinforcement comprising fibres respectively oriented at an angle of +45 degrees, ±5 degrees, and −45 degrees, ±5 degrees, and at least one additional second layer of fibrous reinforcement comprising biaxial fibres respectively oriented at an angle of +0 degrees, ±5 degrees, and +90 degrees, ±5 degrees, laminated on a side of the first layer of biaxial fibrous reinforcement. Typically, the first layers of biaxial fibrous reinforcement comprise glass fibres and have a total areal weight of from 7000 to 9000 g/m$^2$, and the second layers of fibrous reinforcement comprise glass fibres and have an areal weight of from 5000 to 6600 g/m$^2$. The bracket region 178 typically has a total thickness of from 13 to 22 mm.

The reinforcement 175 further comprises a plurality of parallel reinforcing structural beams 200, as shown in FIG. 8, integrally moulded with the reinforced sidewall portion 177, and optionally the bracket region 178, on an inner surface of the sidewall 102, 103. Alternatively, the reinforcing structural beams 200 may be affixed to the reinforced sidewall portion 177, and optionally the bracket region 178. The reinforcing structural beams 200 extend in a direction orthogonal to opposite longitudinal edges 134, 135 of the sidewall 102, 103.

The reinforcing structural beam 200 has the same structure as the structural beam 183 as described above, except that optionally additional fibrous reinforcement is utilised to further reinforce the beam 200.

As described above, the bracket region 178 constitutes an integral part of the sidewall 102, 103. As shown in FIGS. 8 and 9, each sidewall 102, 103 is provided with two longitudinally spaced bracket regions 178 which are located in a lower region 202 of the reinforcement 175 of the respective sidewall 102, 103. The bed plate frame 420 is fitted to the bracket regions 178.

Figure 22:
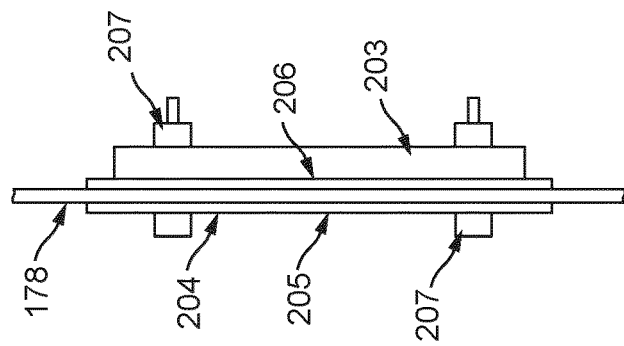
FIG. 22 is a schematic side view of a fitting assembly for fitting the nacelle cover of FIG. 8 to a bed plate frame of a wind turbine.

In particular, as shown in FIG. 22, each sidewall 102, 103 is mounted on a respective metal foundation plate 203 of the bed plate frame 420 by a fitting assembly 204.

The fitting assembly 204 comprises a pair of outer and inner washer plates 205, 206 of metal which sandwich the bracket region 178 of the sidewall 102, 103 therebetween.

The foundation plate 203 is disposed adjacent to the inner washer plate 206. A plurality of threaded bolt and nut fittings 207 bolt together the outer washer plate 205, the bracket region 178 of the sidewall 102, 103, the inner washer plate 206 and the foundation plate 203. Typically, the outer and inner washer plates are each adhered to the respective outer and inner surfaces 207, 208 of the bracket region 178 by a respective adhesive layer (not shown). Typically, the outer and inner washer plates 205, 206 are each comprised of steel having a thickness of from 3 to 50 mm.

Figure 19:
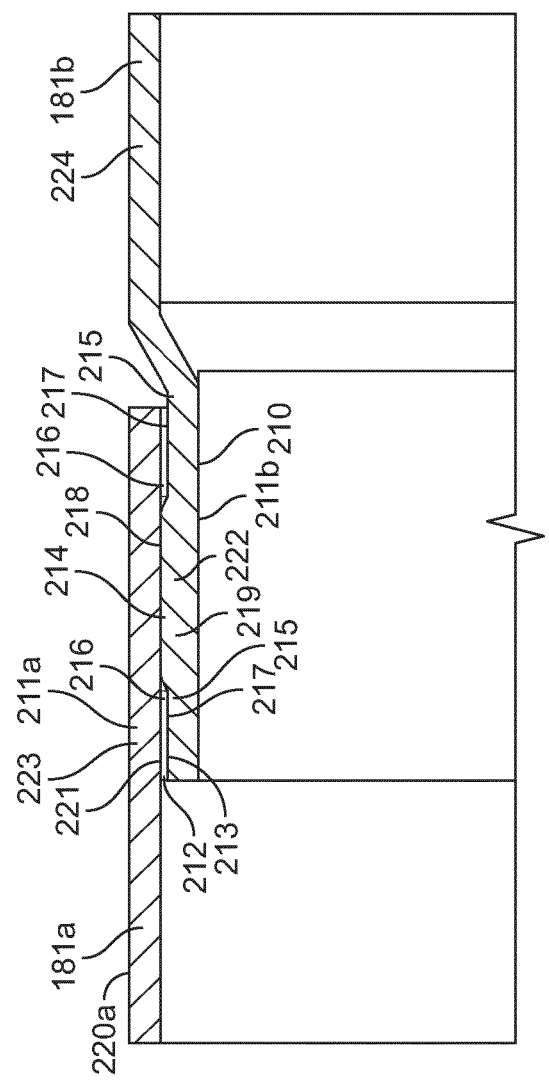
FIG. 19 is a schematic perspective side view, partly in cross-section, of the inner (B) surface of two of the wall elements of the nacelle cover of FIG. 8 which have been fixed together by a method in accordance with a further embodiment of the present invention.
Figure 20:
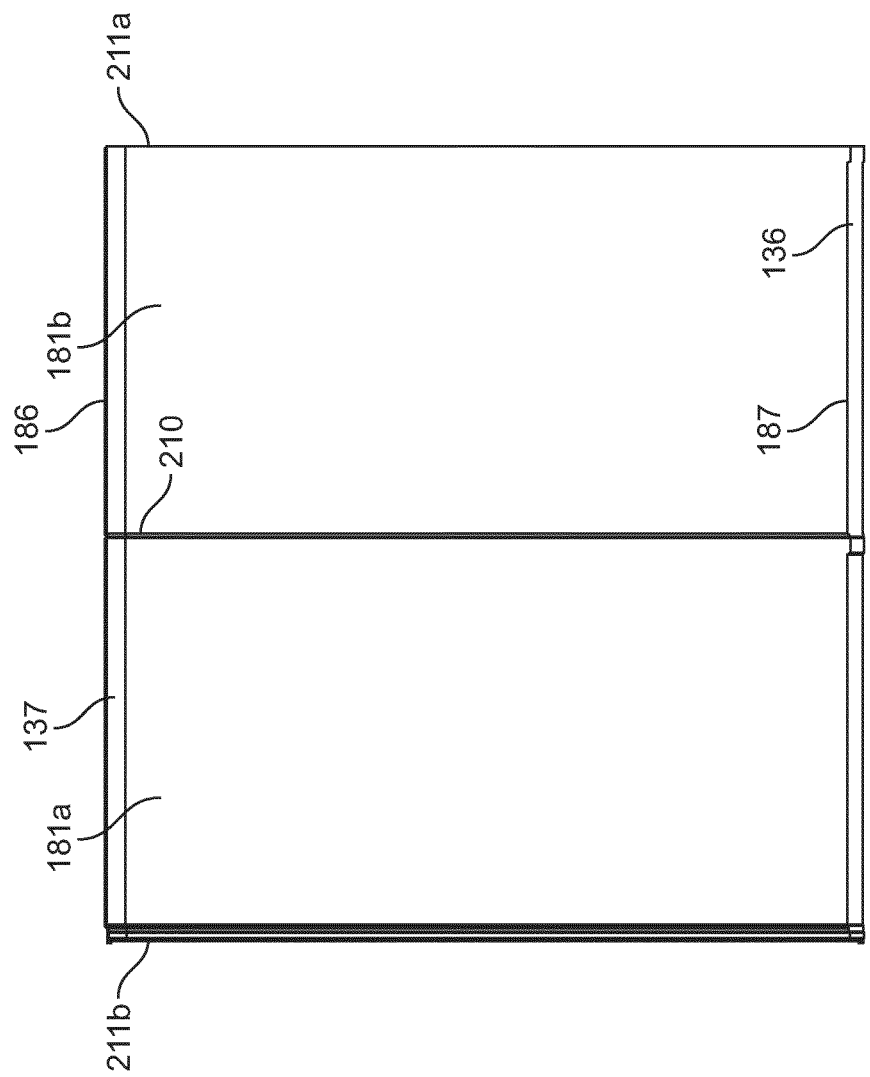
FIG. 20 is a schematic side view of the outer (A) surface of two of the wall elements as shown in FIG. 19 which have been fixed together by the method in accordance with the further embodiment of the present invention.

Referring to FIGS. 19 and 20, as generally described above, each wall element 115, 116, 114, 117 of at least the opposite sidewalls 102, 103 and preferably also the roof 101 and the floor 104, comprises a row of a series of adjacent panels 181a, 181b which extends longitudinally along the housing 105. The adjacent panels 181a, 181b are affixed together by a panel structural joint 210 extending along respective pairs of overlapping edges 211a, 211b of the adjacent panels 181a, 181b.

The pair of overlapping edges 211a, 211b of the adjacent panels 181a, 181b have respective opposed panel facing surfaces 212, 213 extending transversely relative to the longitudinal direction of the housing 105. One of the panel facing surfaces 212 comprises at least one transversely-extending raised portion 214 between a pair of transversely-extending lower portions 215. The raised portion 214 is fixed against the other of the panel facing surfaces 213. Each lower portion 215 is spaced from the other of the panel facing surfaces 213 by a respective gap 216. Each gap 216 is filled with a sealant or adhesive composition 217. Typically, the raised portion 214 has a width of from 10 to 50 mm, for example 35 mm, and the gap 216 has a thickness of from 1 to 5 mm, for example 1.5 mm. In the preferred illustrated embodiment, the adjacent panels 181a, 181b overlap by a distance of from 50 to 150 mm, for example 70 mm.

The raised portion 214 and the region of the other panel facing surface 213 against which the raised portion 214 is fixed comprise a pair of opposed load bearing surfaces 218, 219 of the panel structural joint 210 when the pair of overlapping edges 211a, 211b are bolted together by a bolt extending through the raised portion 214; when the pair of overlapping edges 211a, 211b are adhered together by an adhesive composition 217 in the gap 216, the lower portions 215 and the opposite regions of the other panel facing surface 213 against which the lower portions 215 are affixed comprise the pair of opposed load bearing surfaces 218, 219 of the panel structural joint 210.

With respect to each pair of adjacent panels 181 affixed together by a panel structural joint 210, for a first panel 181a of the pair of panels 181, the overlapping edge 211a is planar with respect to a central part 220a of the respective panel 181a and has a first joining surface 221 which faces inwardly of the housing 105. For a second panel 181b of the pair of panels 181, the overlapping edge 211b is inwardly offset with respect to a central part 220b of the respective panel 181b and has a second joining surface 222 which faces outwardly of the housing 105. The first and second joining surfaces 221, 222 are affixed together to form the panel structural joint 210. The overlapping edge 211a of the first panel 181a has an outer surface 223 which is aligned with an outer surface 224 of the second panel 181b at a location spaced from the panel structural joint 210.

Typically, the panel structural joint 210 has a shear strength, in a plane parallel to the respective overlapping edges 211a, 211b, of more than 60 kN/m.

The flanges 136, 137 may also be connected structurally by a flange structural joint having the same structure as the panel structural joint 210 described above, and manufactured by the method as described below, with the raised and lowered portions extending along the length of the flanges 136, 137. However, as described above, the structural joint 133 formed from the outer and inner flanges 136, 137 along each longitudinally-extending corner 129, 130, 131, 132 has a shear strength, in a plane parallel to the respective outer and inner flanges 136, 137, of more than 120 kN/m; this enhanced shear strength may be achieved by mechanically bolting or riveting together the outer and inner flanges 136, 137 as described hereinabove.

Figure 21A:
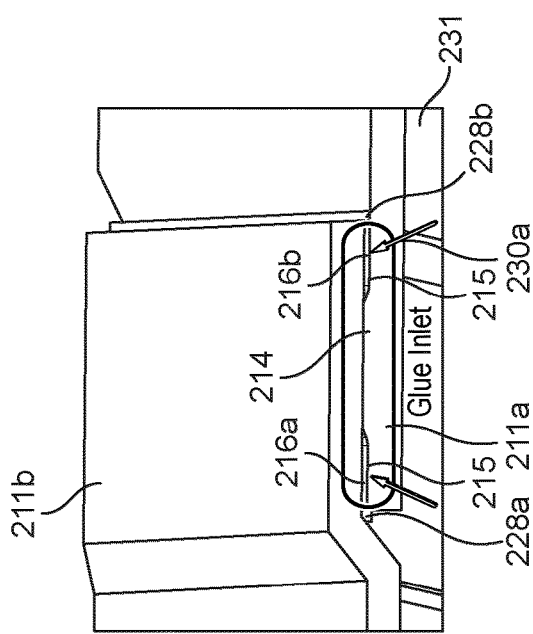
FIGS. 21*a* and 21*b* are schematic perspective views of respective opposite ends of a joint between two of the wall elements as shown in FIG. 19 which are being fixed together by the method in accordance with the further embodiment of the present invention.
Figure 21B:
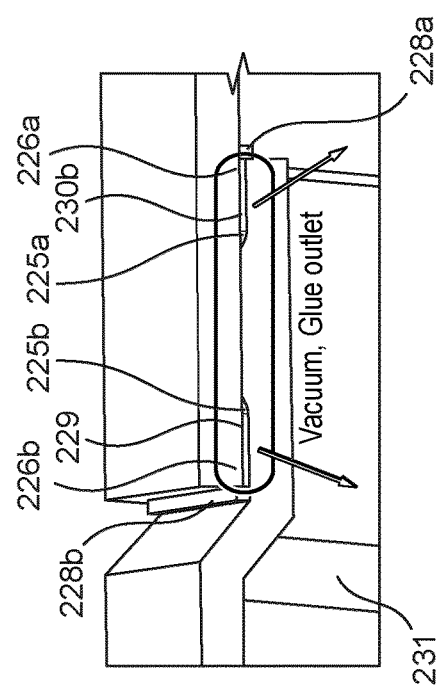

With additional reference to FIGS. 21a and 21b, there is now described a method of joining the adjacent panels 181 comprised of fibre-reinforced polymer composite material, as shown in FIGS. 19 and 20, to form a wall element 114, 115, 116, 117. A similar method may be used to connect the flanges 136, 137.

As described above with respect to FIGS. 19 and 20, a pair of panels 181a, 181b is provided. The pair of panels 181a, 181b is assembled together as a row extending along a longitudinal direction, and the longitudinal edges 186, 187 of the panels 181a, 181b are aligned. The transversely-extending edges 211a, 211b of the panels 181a, 181b are overlapped to provide the pair of opposed panel facing surfaces 212, 213, as described above. The raised portion 214 is assembled against the other panel facing surface 213 and each lower portion 215 is spaced from the other panel facing surface 213 by a respective gap 216. The raised portion 214, the lower portions 215 and the gaps 216a, 216b extend transversely along the transversely-extending edges 211a, 211b of the assembled panels 181a, 181b. Each gap 216a, 216b has a first transverse side 225a, 225b adjacent to the raised portion 214 and an opposite second transverse side 226a, 226b remote from the raised portion 214.

The second transverse side 226a, 226b of each gap 216a, 216b is sealed with a respective elongate sealing element 228a, 228b to define an elongate moulding cavity 229. The cavity 229 comprises the gaps 216a, 216b and has opposite first and second longitudinal ends 230a, 230b.

The first longitudinal end 230a is connected by a tube (not shown) to a source of liquid resin (not shown) of a sealant or adhesive composition 217. The second longitudinal end 230b is connected by a tube (not shown) to a source of negative pneumatic pressure (not shown).

A liquid resin is infused into the moulding cavity 229 from the first longitudinal end 230a by application of the negative pneumatic pressure to the second longitudinal end 230b, thereby to fill the moulding cavity 229 with the liquid resin. Finally, the liquid resin is allowed to harden, and optionally cure, thereby to form a panel structural joint 210 between the pair of panels 181a, 181b.

In one embodiment, the liquid resin is an adhesive composition 217 and the adhesive composition 217 provides the entire bond of the panel structural joint 210 between the pair of panels 181a, 181b.

In another embodiment, the liquid resin is a sealant composition and the method further comprises the step of inserting a mechanical element, such as a bolt or rivet (not shown), through the thickness of the pair of transverse edges 211a, 211b to form the panel structural joint 210 between the pair of panels 181a, 181b. When such a mechanical element is employed, a gasket may be disposed between the pair of transverse edges 2111a, 211b.

Preferably, during the assembling step the pair of panels 181a, 181b are assembled together on a template 231 having a three-dimensionally shaped surface which is configured to mate complementarily with a three-dimensionally shaped surface of each of the pair of panels 181a, 181b so that the transversely-extending edges 211a, 211b overlap by a predetermined distance along the length of the panel structural joint 210.

The method may be used simultaneously to join together more than two panels 181 in a row so that the entire wall element 114, 115, 116, 117 can be assembled from a plurality of panels 181 in a single manufacturing operation.

Figure 25:
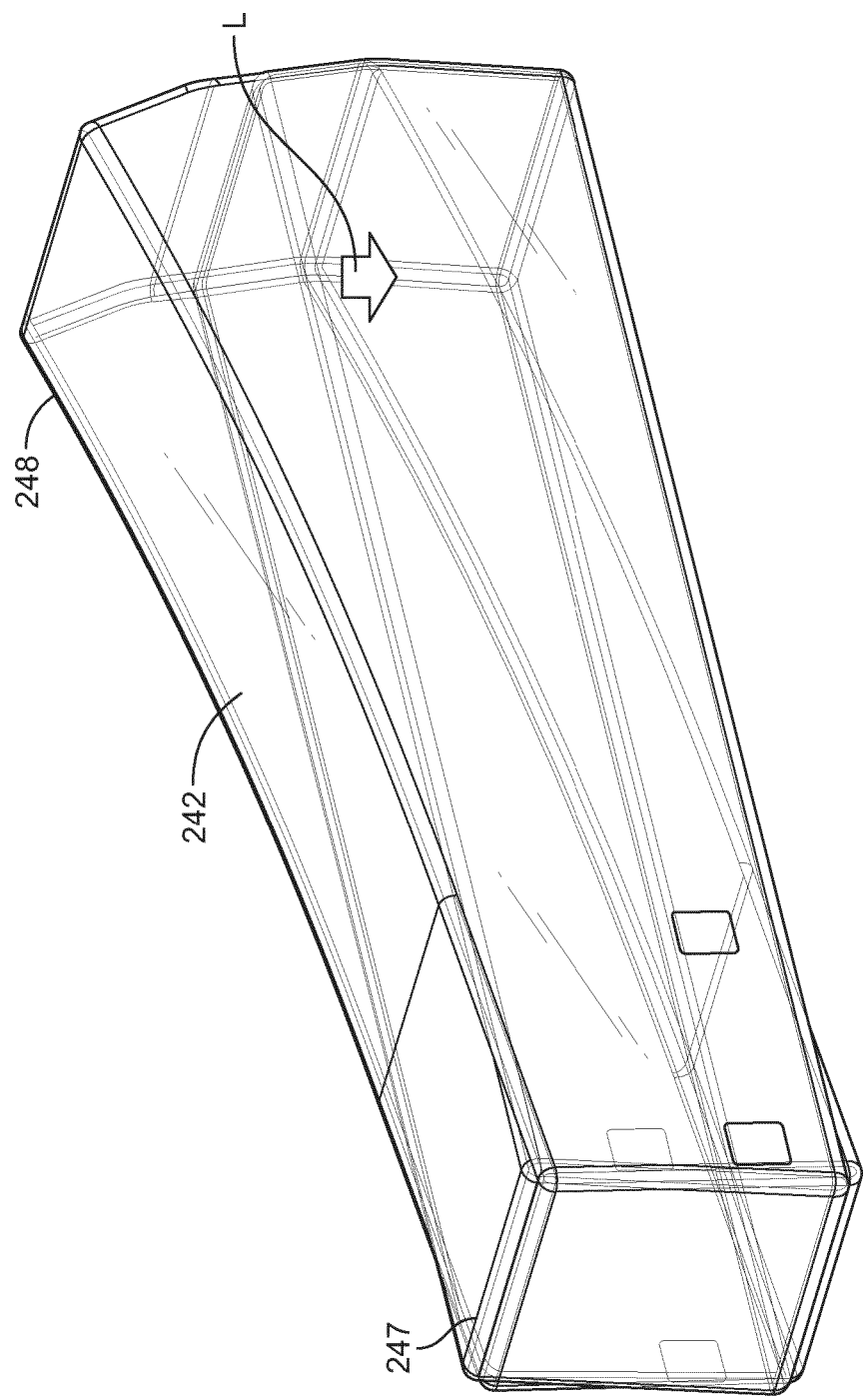
FIG. 25 is a schematic perspective side view from above and the front showing how the nacelle cover of FIG. 23 changes shape and configuration between the unloaded and loaded states.

A further embodiment of the nacelle cover of the present invention is illustrated in FIGS. 23 to 25. FIG. 23 is a side view showing the nacelle cover in an unloaded state; FIG. 24 is a side view showing the nacelle cover in a loaded state; and FIG. 25 is a perspective side view from above and the front showing how the nacelle cover changes shape and configuration between the unloaded and loaded states.

In FIGS. 23 to 25, the changes in shape and configuration between the unloaded and loaded states of the nacelle cover are illustrated in a highly exaggerated form for clarity of illustration.

The nacelle cover 240, comprising a housing 245, has substantially the same structure as the embodiment shown in FIG. 8. As shown in FIG. 9, at least one machinery component of the wind turbine is mounted on the housing 245 at a position laterally spaced from the tower in a longitudinal direction along the housing 245. The housing 245 comprises a structural tube 242 which functions as a vertically displaceable cantilever beam carrying the load of the at least one machinery component mounted thereon.

In in an unloaded state prior to mounting the at least one machinery component on the housing 245, the rear end 2488 is higher than the front end 247. In the illustrated embodiment, in the unloaded state the structural tube 242 is upwardly curved in a direction from the front end 247 to the rear end 248. Typically the upward curvature has a radius of curvature of at least 2000 m, optionally from 2000 to 20000 m. Typically, the upward curvature is continuous along at least the length of the housing 245 which extends laterally from the tower 252.

Typically, in the unloaded state the structural tube 242 of the elongate housing 245 is upwardly curved from the front end 247 to the rear end 248 to define an inversed deflection curve, with a maximum deflection at the rear end of 0.1 to 1% of the length of the housing 105 which extends laterally from the tower 122.

In contrast, in a loaded state after mounting the at least one machinery component on the housing 245, which is schematically represented by the arrow L in FIG. 25, the rear end 248 is lowered as compared to the unloaded state by flexural elastic deformation of the structural tube 242. The length of the housing 245 which extends laterally from the tower 252 is deflected downwardly. Typically, in the loaded state the structural tube 242 is linear. Preferably, in the loaded state the structural tube 242 is within an angular range of +/−1 degree to the horizontal.

As described above with respect to the bracket regions 178 shown in FIG. 9, the front end 247 of the housing 245 is mounted to the tower 252 by a plurality of fitting assemblies 204, as shown in FIG. 22, at bracket regions 278 on the opposite sidewalls 502. For example, the front end 247 of the housing 245 is mounted on the bed plate frame 420, as shown in FIG. 9, which is affixed to the tower 252, the bed plate frame 420 supporting at least one part of a drive train of the wind turbine. In the unloaded state the fitting assemblies 204 are disposed in a first rotational position relative to the tower 252 and the fitting assemblies 204 rotate downwardly to a second rotational position relative to the tower 252 in the loaded state. Typically, as described herein, the fitting assemblies 204 comprise bolts or pins which define support points on the front end 247 of the housing 245. When the housing 245 is under a vertical load, the support points rotate, but also an angular deflection in the sidewalls 502 causes the nacelle cover 240 to rotate downwardly even when the support points do not rotate.

Typically, as described above with reference to FIG. 9, the at least one machinery component is directly or indirectly mounted on the sidewalls 502 of the housing 245 and the sidewalls 502 of the housing 245 support the load of the at least one machinery component. Plural machinery components may be directly or indirectly mounted on the sidewalls 502 at respective positions along the housing 245 laterally spaced from the tower 522. The sidewalls 502 support the load of the machinery components at the respective positions.

As described above with reference to FIGS. 8 to 10, the roof 501, opposite sidewalls 502 and floor 504 are assembled at each longitudinally-extending corner of the housing 245 by at least one respective fixing mechanism to form a structural joint along the respective longitudinally-extending corner. Accordingly, the opposite sidewalls 502 function as opposite load-bearing webs of the vertically displaceable cantilever beam to carry the turning moment load, about the mounting to the bed plate frame, of the housing 245 and the at least one machinery component mounted on the housing 245. At least one or both of the roof 501 and floor 504 function as flanges of the vertically displaceable cantilever beam interconnecting the opposite load-bearing webs of the vertically displaceable cantilever beam.

In addition, the roof 501 and floor 504 function as opposite load-bearing webs of a horizontally displaceable cantilever beam to carry a lateral load, for example a wind load or a yaw load applied to the housing 245 about the mounting to the bed plate frame. The opposite sidewalls 502 function as flanges of the horizontally displaceable cantilever beam interconnecting the opposite load-bearing webs of the horizontally displaceable cantilever beam.

The invention claimed is:

1. A nacelle cover for a wind turbine, wherein the nacelle cover comprises a roof, opposite sidewalls and a floor assembled together to form a composite material elongate housing defining an interior space for containing machinery components of the wind turbine, the housing having a front end for mounting to a tower of the wind turbine, and an opposite rear end, wherein each of the roof, the opposite sidewalls and the floor comprises a fibre-reinforced polymer composite material, wherein the front end of the housing is mounted on a bed plate frame which is affixed to the tower, the bed plate frame supporting at least one part of a drive train of the wind turbine, and at least one machinery component of said machinery components is mounted on the housing at a position laterally spaced from the bed plate frame in a longitudinal direction along the housing, and the housing comprises a structural tube which is constructed and arranged as a cantilever beam that is vertically displaced by a load of the at least one machinery component mounted thereon, wherein the at least one machinery component is directly mounted on the sidewalls of the housing and the sidewalls of the housing directly support the load of the at least one machinery component.

2. The nacelle cover according to claim 1, wherein the at least one machinery component comprises at least one or both of a machinery component of the drive train and a transformer of the wind turbine which are directly or indirectly mounted on the sidewalls of the housing at respective positions along the housing laterally spaced from the bed plate frame, and the sidewalls of the housing directly or indirectly support the load of the machinery component of the drive train and the transformer at the respective positions.

3. The nacelle cover according to claim 2, wherein at least one or both of the machinery component of the drive train and the transformer of the wind turbine is or are directly or indirectly mounted on the sidewalls of the housing at the rear end of the housing.

4. The nacelle cover according to claim 2, wherein the machinery component of the drive train, which is directly or indirectly mounted on the sidewalls of the housing at the rear end of the housing, comprises the generator.

5. The nacelle cover according to claim 2, wherein a rear frame part is affixed to the bed plate frame and extends rearwardly of the bed plate frame within the housing, and the at least one machinery component of the drive train is mounted on the rear frame part.

6. The nacelle cover according to claim 1, wherein the roof, opposite sidewalls and floor are assembled at each longitudinally-extending corner of the housing by at least one respective fixing mechanism to form a structural joint at least partially along the respective longitudinally-extending corner, whereby the opposite sidewalls function as opposite load-bearing webs of the vertically displaced cantilever beam to carry a turning moment load, wherein the front end of the housing is mounted on the bed plate frame — the turning moment load being about the bed plate frame of the housing and the at least one machinery component mounted on the housing, and at least one or both of the roof and floor function as a respective flange of the vertically displaced cantilever beam interconnecting the opposite load-bearing webs of the vertically displaced cantilever beam.

7. The nacelle cover according to claim 6, wherein the roof and floor are constructed and arranged to carry a lateral load applied to the bed plate frame.

8. The nacelle cover according to claim 1, wherein the sidewall, and each of the roof and the floor, has an in-plane shear strength of from 25 to 40 N/mm$^2$ and an in-plane compression strength of from 200 to 250 N/mm$^2$.

9. The nacelle cover according to claim 1, wherein the front end of the housing is mounted on the bed plate frame, and wherein the structural tube is configured to resist a vertical load of at least 500 kN, and a vertical bending moment of at least 3500 kNm, applied to the housing at a lateral position between the front end of the housing and the bed plate frame which is affixed to the tower, and/or the structural tube is configured to resist a horizontal lateral load of at least 100 kN, and a horizontal bending moment of at least 1200 kNm, applied to the housing at a lateral position between the front end of the housing and the bed plate frame which is affixed to the tower.

10. The nacelle cover according to claim 1, wherein in that each sidewall is mounted on a respective metal foundation plate of the bed plate frame by a fitting assembly, wherein the fitting assembly comprises a pair of outer and inner washer plates of metal which sandwich the sidewall therebetween, the foundation plate being disposed adjacent to the inner washer plate, and a plurality of threaded bolt and nut fittings which bolt together the outer washer plate, the sidewall, the inner washer plate and the foundation plate.

11. A nacelle cover for a wind turbine, wherein the nacelle cover comprises a roof, opposite sidewalls and a floor assembled together to form a composite material elongate housing defining an interior space for containing machinery components of the wind turbine, the housing having a front end for mounting to a tower of the wind turbine, and an opposite rear end, wherein each of the roof, the opposite sidewalls and the floor comprises a fibre-reinforced polymer composite material, wherein the front end of the housing is mounted on a bed plate frame which is affixed to the tower, the bed plate frame supporting at least one part of a drive train of the wind turbine, and at least one machinery component of said machinery components is mounted on the housing at a position laterally spaced from the bed plate frame in a longitudinal direction along the housing, and the housing comprises a structural tube which is constructed and arranged as a cantilever beam that is vertically displaced by a load of the at least one machinery component mounted thereon, wherein (i) the at least one machinery component is directly mounted on the sidewalls of the housing and the sidewalls of the housing directly support the load of the at least one machinery component, and/or (ii) the at least one machinery component is mounted on a reinforced area of the floor of the housing which is fitted to the sidewalls, a transverse reinforced interior floor of the housing which is fitted to the sidewalls or a transverse support assembly which is fitted to the sidewalls, and thereby the at least one machinery component is indirectly mounted on the sidewalls of the housing, and the sidewalls of the housing indirectly support the load of the at least one machinery component, wherein the opposite sidewalls are provided with a fibre-reinforced polymer composite material reinforcement at opposite regions of the sidewalls at which the front end of the housing is mounted on the bed plate frame, wherein the regions of the sidewalls which comprise the fibre-reinforced polymer composite material reinforcement comprise additional layers of fibrous reinforcement compared to other regions of the sidewalls which do not comprise the fibre-reinforced polymer composite material reinforcement.

12. A nacelle cover for a wind turbine, wherein the nacelle cover comprises a roof, opposite sidewalls and a floor assembled together to form a composite material elongate housing defining an interior space for containing machinery components of the wind turbine, the housing having a front end for mounting to a tower of the wind turbine, and an opposite rear end, wherein each of the roof, the opposite sidewalls and the floor comprises a fibre-reinforced polymer composite material, wherein the front end of the housing is mounted on a bed plate frame which is affixed to the tower, the bed plate frame supporting at least one part of a drive train of the wind turbine, and at least one machinery component of said machinery components is mounted on the housing at a position laterally spaced from the bed plate frame in a longitudinal direction along the housing, and the housing comprises a structural tube which is constructed and arranged as a cantilever beam that is vertically displaced by a load of the at least one machinery component mounted thereon, wherein (i) the at least one machinery component is directly mounted on the sidewalls of the housing and the sidewalls of the housing directly support the load of the at least one machinery component, and/or (ii) the at least one machinery component is mounted on a reinforced area of the floor of the housing which is fitted to the sidewalls, a transverse reinforced interior floor of the housing which is fitted to the sidewalls or a transverse support assembly which is fitted to the sidewalls, and thereby the at least one machinery component is indirectly mounted on the sidewalls of the housing, and the sidewalls of the housing indirectly support the load of the at least one machinery component, wherein the opposite sidewalls are provided with a fibre-reinforced polymer composite material reinforcement at opposite regions of the sidewalls at which the front end of the housing is mounted on the bed plate frame, wherein the regions of the sidewalls which comprise the fibre-reinforced polymer composite material reinforcement comprise additional layers of fibrous reinforcement compared to other regions of the sidewalls which do not comprise the fibre-reinforced polymer composite material reinforcement, wherein each sidewall is provided with two longitudinally spaced bracket regions which are located in a lower region of the reinforcement of the respective sidewall, each bracket region constituting an integral part of the respective sidewall, each bracket region is fitted to the bed plate frame by a respective fitting assembly, and each fitting assembly comprises a bolt or pin which defines a support point on the front end of the housing.

13. The nacelle cover according to claim 12, wherein the reinforced sidewall portion extends from the front end of the housing in a direction towards the rear end of the housing and defines at least 20% of the length of the respective sidewall and/or wherein the reinforced sidewall portion extends from the floor of the housing in a direction towards the roof of the housing and defines at least 50% of the height of the respective sidewall.

14. The nacelle cover according to claim 12, wherein the fibre-reinforced polymer composite material of the reinforced sidewall portion comprises at least two first layers of biaxial fibrous reinforcement, wherein the biaxial fibrous reinforcement comprises fibres respectively oriented at an angle within the range of from +30 to +60 degrees, and within the range of from −30 to −60 degrees, to a longitudinal direction along the housing.

15. The nacelle cover according to claim 14, wherein the fibre-reinforced polymer composite material of the reinforced sidewall portion further comprises at least one second layer of fibrous reinforcement laminated on each side of each of the two first layers of biaxial fibrous reinforcement, wherein each second layer of fibrous reinforcement comprises biaxial fibres respectively oriented at an angle of +0 degrees, ±5 degrees, and +90 degrees, ±5 degrees, to the longitudinal direction of the housing.

16. The nacelle cover according to claim 15, wherein each first layer of biaxial fibrous reinforcement comprises glass fibres and has an areal weight of from 1400 to 1800 $g/m^2$, and each second layer of fibrous reinforcement comprises glass fibres and has an areal weight of from 1250 to 1650 $g/m^2$, and the reinforced sidewall portion has a total thickness of from 10 to 16 mm.

17. The nacelle cover according to claim 12, wherein the fibre-reinforced polymer composite material of the bracket region comprises at least three first layers of biaxial fibrous reinforcement, wherein the biaxial fibrous reinforcement comprises fibres respectively oriented at an angle within the range of from +30 to +60 degrees, and within the range of from −30 to −60 degrees, to a longitudinal direction along the housing.

18. The nacelle cover according to claim 17, wherein the fibre-reinforced polymer composite material of the bracket region further comprises at least one second layer of fibrous reinforcement laminated on each side of each of the three first layers of biaxial fibrous reinforcement, wherein each second layer of fibrous reinforcement comprises biaxial fibres respectively oriented at an angle of +0 degrees, ±5 degrees, and +90 degrees, ±5 degrees, to the longitudinal direction of the housing.

19. The nacelle cover according to claim 18, wherein each first layer of biaxial fibrous reinforcement comprises glass fibres and has an areal weight of from 1400 to 1800 $g/m^2$, and each second layer of fibrous reinforcement comprises glass fibres and has an areal weight of from 1250 to 1650 $g/m^2$, and the bracket region has a total thickness of from 13 to 22 mm.

20. The nacelle cover according to claim 12, wherein the fibre-reinforced polymer composite material reinforcement further comprises a plurality of parallel reinforcing structural beams integrally moulded with, or affixed to, the reinforced sidewall portion and the bracket region on an inner surface of the sidewall, the reinforcing structural beams extending in a direction orthogonal to opposite longitudinal edges of the sidewall, the longitudinal edges extending along a longitudinal direction of the housing.

21. The nacelle cover according to claim 20, wherein the reinforcing structural beam comprises an elongate body of a cellular core material, or a void, having a cross-section in the shape of a trapezium, a lower face of the elongate body defining the larger width of the trapezium and being adjacent to the reinforced sidewall portion, and a reinforcing fibre-reinforced polymer composite material covering the elongate body, or void, the reinforcing fibre-reinforced polymer composite material being integrally moulded with, or affixed to, the fibre-reinforced polymer composite material of the reinforced sidewall portion thereby to sandwich the cellular core material, or void, between the fibre-reinforced polymer composite material of the reinforced sidewall portion and the reinforcing fibre-reinforced polymer composite material.

22. The nacelle cover according to claim 21, wherein the reinforcing fibre-reinforced polymer composite material comprises at least one layer of unidirectional fibrous reinforcement at least partly covering the elongate body, or void, the unidirectional fibres extending along the length of the reinforcing structural beam and the at least one layer of unidirectional fibrous reinforcement comprises a plurality of unidirectional glass fibre layers having a total areal weight of from 2500 to 4000 $g/m^2$.

23. The nacelle cover according to claim 21, wherein the reinforcing fibre-reinforced polymer composite material further comprises at least one upper layer of fibrous reinforcement transversely extending over the elongate body, or void, and laminated to the fibre-reinforced polymer composite material of the reinforced sidewall portion part adjacent to and along opposite transverse sides of the elongate body, or void, wherein the upper layer of fibrous reinforcement comprises biaxial fibres respectively oriented at an angle of +0 degrees and +90 degrees to the longitudinal direction of the reinforcing structural beam.

24. The nacelle cover according to claim 12, wherein between the reinforced sidewall portion and the rear end of the housing, the opposite sidewalls comprise a respective rear wall portion, and each rear wall portion is comprised of a wall part comprising a fibre-reinforced polymer composite material which comprises layers of fibrous reinforcement which extend into the reinforced sidewall portion, and a plurality of parallel structural beams integrally moulded with, or affixed to, the wall part on an inner surface of the sidewall, wherein the structural beams extend in a direction orthogonal to opposite longitudinal edges of the sidewall, the longitudinal edges extending along a longitudinal direction of the housing from the front end of the housing towards the rear end of the housing.

25. The nacelle cover according to claim 24, wherein the fibre-reinforced polymer composite material comprises at least one first layer of biaxial fibrous reinforcement, wherein the biaxial fibrous reinforcement comprises fibres respectively oriented at an angle within the range of from +30 to +60 degrees, and within the range of from −30 to −60 degrees, to a longitudinal direction along the housing.

26. The nacelle cover according to claim 25, wherein the fibre-reinforced polymer composite material further comprises at least one second layer of fibrous reinforcement laminated on each side of the at least one first layer of biaxial fibrous reinforcement, wherein each second layer of fibrous reinforcement comprises biaxial fibres respectively oriented at an angle of +0 degrees, ±5 degrees, and +90 degrees, ±5 degrees, to the longitudinal direction of the housing from the front end of the housing towards the rear end of the housing.

27. The nacelle cover according to claim 26, wherein the at least one first layer of biaxial fibrous reinforcement comprises glass fibres and has a total areal weight of from 1400 to 1800 $g/m^2$, and each second layer of fibrous reinforcement comprises glass fibres and has an areal weight of from 1250 to 1650 $g/m^{2'}$, and the wall part has a total thickness of from 6 to 9 mm.

28. The nacelle cover according to claim 24, wherein the structural beam comprises an elongate body of a cellular core material, or a void, having a cross-section in the shape of a trapezium, a lower face of the elongate body, or void, defining the larger width of the trapezium and being adjacent to the wall part, and a second fibre-reinforced polymer composite material covering the elongate body, or void, the second fibre-reinforced polymer composite material being integrally moulded with, or affixed to, the fibre-reinforced polymer composite material of the wall part thereby to sandwich the cellular core material, or void, between the fibre-reinforced polymer composite material of the wall part and the second fibre-reinforced polymer composite material.

\* \* \* \* \*